US011623265B2

United States Patent
Khansa et al.

(10) Patent No.: US 11,623,265 B2
(45) Date of Patent: Apr. 11, 2023

(54) POWER SWAGE TOOL

(71) Applicant: DMC Power, Inc., Carson, CA (US)

(72) Inventors: Eyass Khansa, Long Beach, CA (US); Mark McMichael, La Habra, CA (US); Roy Perez, Torrance, CA (US)

(73) Assignee: DMC POWER, INC., Carson, CA (US)

( * ) Notice: Subject to any disclaimer, the term of this patent is extended or adjusted under 35 U.S.C. 154(b) by 604 days.

(21) Appl. No.: 15/857,335

(22) Filed: Dec. 28, 2017

(65) Prior Publication Data

US 2019/0201966 A1 Jul. 4, 2019

(51) Int. Cl.
| | |
|---|---|
| *B21D 39/04* | (2006.01) |
| *B25B 27/10* | (2006.01) |
| *F16G 11/02* | (2006.01) |
| *H01R 43/058* | (2006.01) |

(52) U.S. Cl.
CPC .......... *B21D 39/048* (2013.01); *B25B 27/10* (2013.01); *F16G 11/02* (2013.01); *H01R 43/058* (2013.01)

(58) Field of Classification Search
CPC .... B21D 39/04; B21D 39/048; H01R 43/042; H01R 43/0424; H01R 43/0427; H01R 43/0428; H01R 43/048; H01R 43/058; H01R 43/0585; B25B 27/10; B25B 27/146
See application file for complete search history.

(56) References Cited

U.S. PATENT DOCUMENTS

| | | | | |
|---|---|---|---|---|
| 2,775,806 A | * | 1/1957 | Love | F16L 23/06 24/271 |
| 2,982,982 A | * | 5/1961 | Swift, Sr. | E06C 7/14 15/257.06 |
| 3,823,597 A | | 7/1974 | Hanback et al. | |
| 3,943,846 A | | 3/1976 | Geisow et al. | |
| 4,010,922 A | * | 3/1977 | Heller | A47C 4/02 248/165 |

(Continued)

FOREIGN PATENT DOCUMENTS

WO  WO 2014/115661 A1  7/2014

OTHER PUBLICATIONS

DMCPowerToolConnectors, DMC DLT 45 Demonstration, Aug. 31, 2011, Youtube, https://www.youtube.com/watch?v=hJ5zFrXcXro (Year: 2011).*

(Continued)

*Primary Examiner* — Shelley M Self
*Assistant Examiner* — Mohammed S. Alawadi
(74) *Attorney, Agent, or Firm* — BakerHostetler

(57) ABSTRACT

A swage tool includes a power unit connected to a yoke. The power unit exerts vertical force on a die block. The yoke holds swage dies in place and opposes the force exerted by the die block. The die block transfers the load exerted by the power unit into the swage dies, which surround the connector. The swage dies convert vertical force from the power unit into a radial swage on the connector. Quick release endplates hold the swage dies in place in the yoke and the die block. A yoke shroud keeps broken pieces of the yoke together if the yoke fails. A counter records the number of swages made by the tool. A rotating handle, a stand, remote wireless actuation and swage die identification imprints are also provided.

28 Claims, 37 Drawing Sheets

(56) References Cited

U.S. PATENT DOCUMENTS

| | | | | |
|---|---|---|---|---|
| 5,971,333 | A * | 10/1999 | Fiedor | B25H 3/06 280/47.35 |
| 6,059,138 | A * | 5/2000 | Labruyere | A47G 23/0225 220/574 |
| 6,082,227 | A | 7/2000 | Vogel | |
| 6,662,620 | B1 * | 12/2003 | Baron | B21D 39/034 72/409.01 |
| 7,299,674 | B2 * | 11/2007 | Palejwala | B21D 39/048 72/402 |
| 9,085,023 | B2 | 7/2015 | Danhash et al. | |
| 9,737,982 | B2 | 8/2017 | Danhash et al. | |
| 2003/0060344 | A1 * | 3/2003 | David | A63B 21/0628 482/98 |
| 2004/0007094 | A1 * | 1/2004 | Johnson, Jr. | B25B 7/123 81/2 |
| 2006/0248939 | A1 * | 11/2006 | Palejwala | B25B 27/10 72/416 |
| 2008/0307934 | A1 * | 12/2008 | Coe | B25B 7/02 72/409.16 |
| 2010/0096530 | A1 | 4/2010 | Chiu | |
| 2012/0030917 | A1 * | 2/2012 | Danhash | B21D 39/04 29/237 |
| 2013/0000051 | A1 * | 1/2013 | Cleland | B26D 3/169 7/128 |
| 2014/0020226 | A1 | 1/2014 | Danhash et al. | |
| 2014/0237797 | A1 * | 8/2014 | Danhash | B25B 27/10 29/237 |
| 2015/0222072 | A1 | 8/2015 | Therrien | |
| 2017/0252911 | A1 * | 9/2017 | Barezzani | B25F 5/005 |
| 2017/0317461 | A1 * | 11/2017 | Wason | H01R 43/0427 |

OTHER PUBLICATIONS

Daniels Manufacturing Corporation, Digital Cycle Counter for Crimp Tools, 2012, https://files.dmctools.com/public/products/afm8-cc/attachments/afm8-cc_sl_6kY62iM.pdf (Year: 2012).*

DMC Power, 360° Swaging Power, 2014, https://dmcpower.com/wp-content/uploads/2014/10/Swage-Tool.pdf (Year: 2014).*

International Patent Application No. PCT/US2018/67557; Int'l Search Report and the Written Opinion; dated Apr. 15, 2019; 16 pages.

International Patent Application No. PCT/US2018/067557; Int'l Preliminary Report on Patentability; dated Mar. 4, 2020; 47 pages.

* cited by examiner

POWER SWAGE TOOL

BACKGROUND OF THE INVENTION

Swaged power connectors are used to make a mechanical and electrical connection to buses or cables in a variety of applications. To make this connection, a bus or cable is inserted into a connector and a swage tool is used to create a swage (compression) of the connector onto the bus/cable. During swaging, hydraulic pressure built up from a pump in the power unit is converted into a compressive force that is applied to a die block via a piston in the power unit. The die block transfers the load to a bottom swage die that contacts an upper swage die and begins to close on the connector. When the pump pressure reaches a designated level, such as 10,000 psi, the swage dies are fully compressed on the connector and the swage is completed. The swage dies compress the connector radially inwardly, which causes material to be deformed toward the inner surface. The closing of an inner surface of the connector is transferred to the bus/cable, and an annular indentation is created that secures the connector to the bus/cable.

SUMMARY OF THE INVENTION

The present invention provides various improvements over previous power swage tools. Quick release endplates are provided to facilitate rapid changes between various swage die sizes and endplate sizes. Novel assemblies are provided to fix the yoke to the power unit and limit the possibility of the yoke sliding off the power unit. A yoke shroud keeps the two pieces of the yoke together in order to protect the operator and bystanders in the event of yoke failure. A sensor- or switch-based counter records and displays the number of swages the yoke and cylinder have undergone, allowing the customer and/or manufacturer to track swaging cycles and know when to service the tool. A rotating handle allows the operator to quickly remove and/or reposition the swage tool in the field, and allows for more orientations of the tool, thereby improving tool usability and operator comfort. A wireless control remotely actuates the tool in situations where the pump and operator of the tool are remotely located. A stand permits the operator to safely and stably set the swage tool down without need for disassembly. Swage die identification imprints identify on the swage connection itself the source of the swage die used to create the swage on the connector. A system to quickly identify various swage dies and sizes is also provided.

BRIEF DESCRIPTION OF THE DRAWINGS

FIG. 1013 is a perspective view of the fourth quick release endplate assembly assembled onto the yoke.

DETAILED DESCRIPTION OF THE INVENTION

Figure 1:
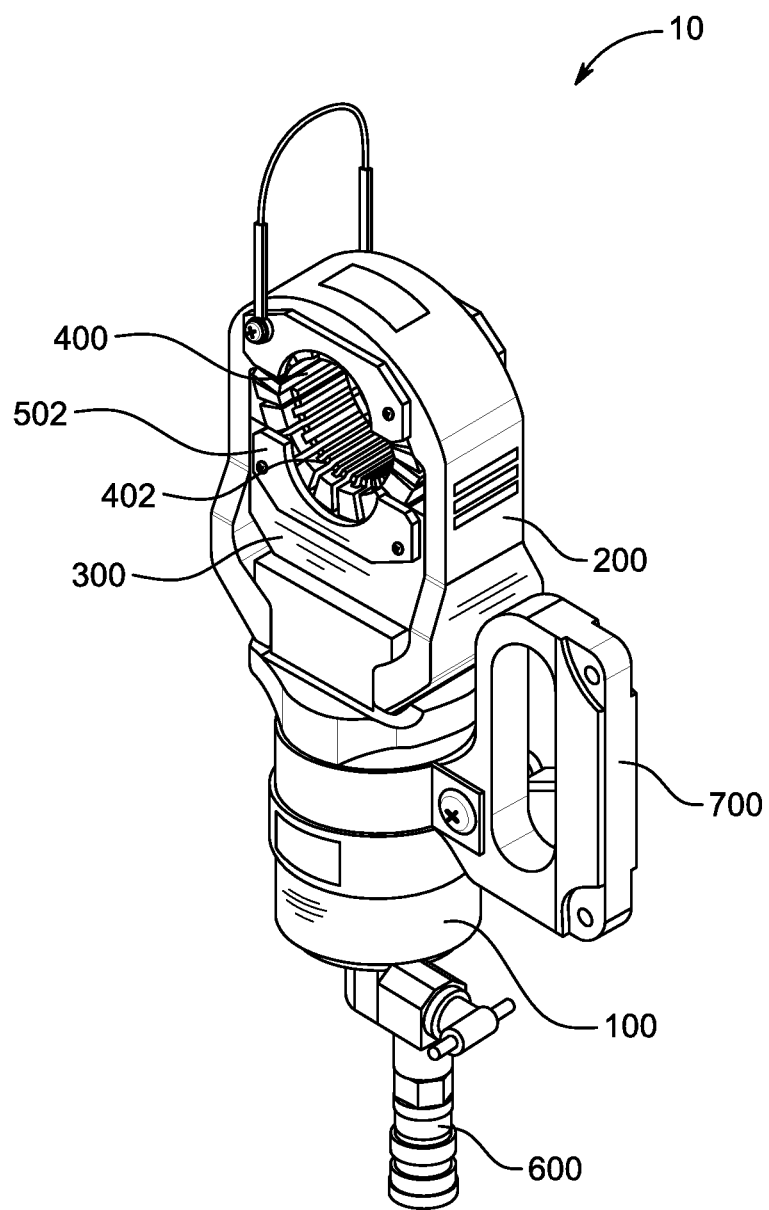
FIG. 1 is a perspective view of a swage tool according to the invention.
Figure 2:
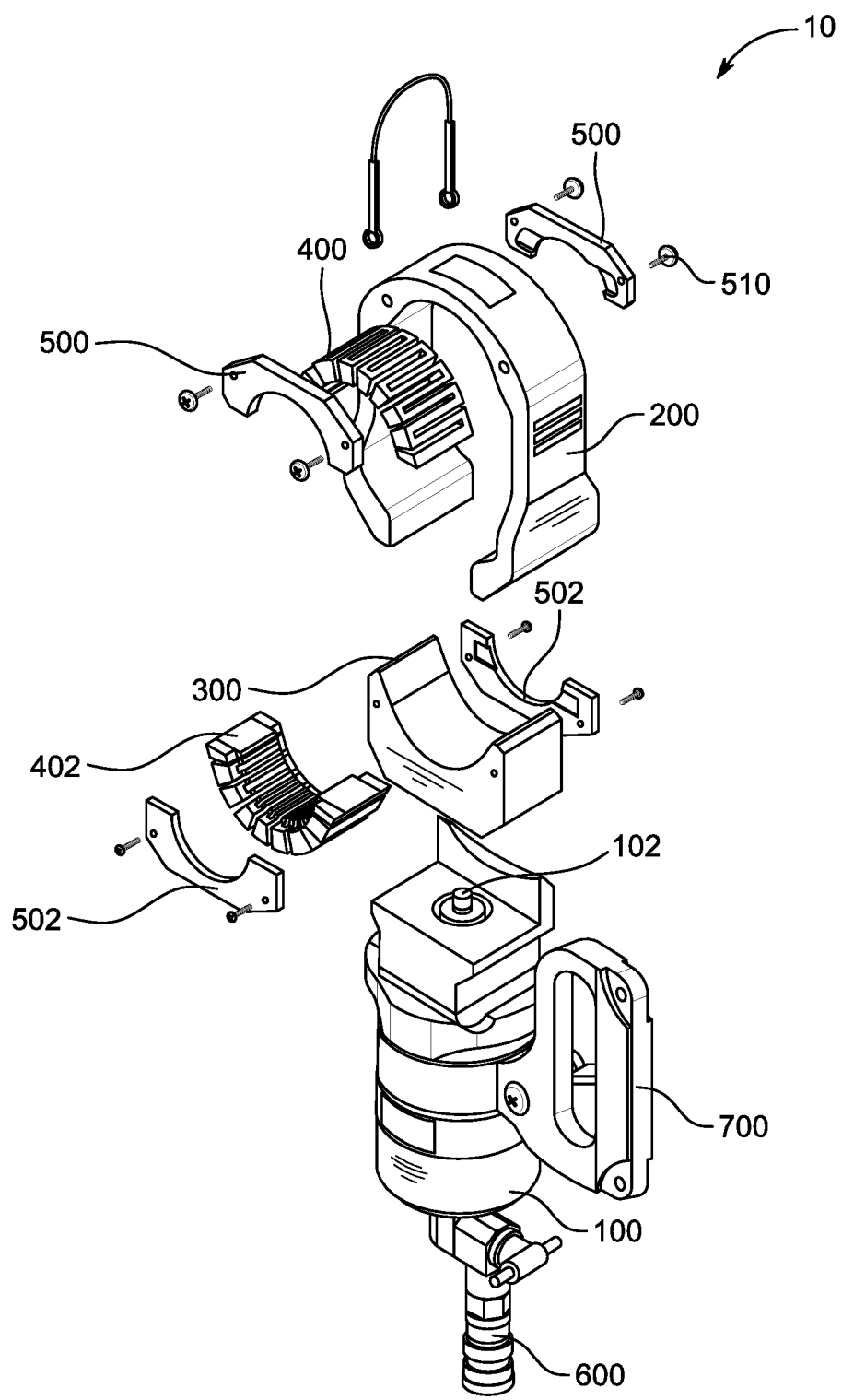
FIG. 2 is an exploded, disassembled view of the swage tool of FIG. 1.
Figure 3A:
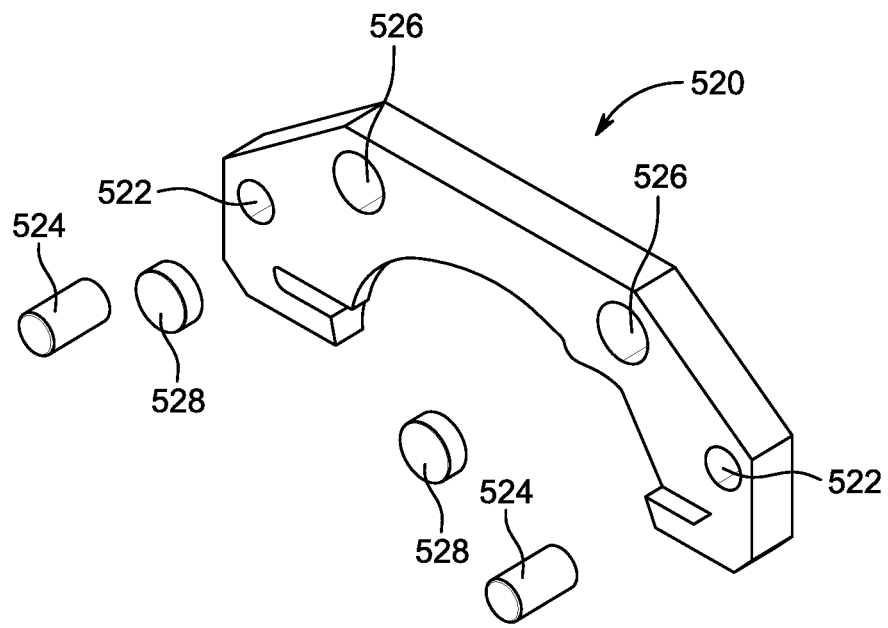
FIG. 3A is a disassembled, perspective view of a first quick release endplate assembly according to the invention.
Figure 3B:
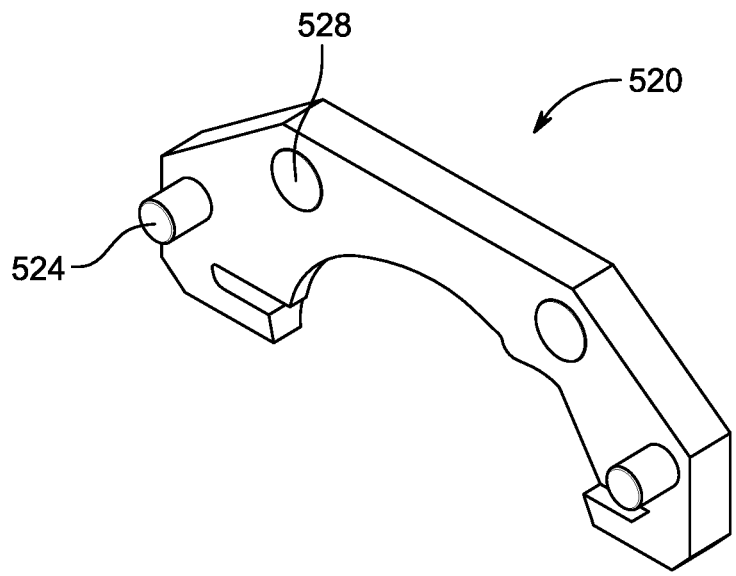
FIG. 3B is an assembled, perspective view of the first quick release endplate assembly.
Figure 4:
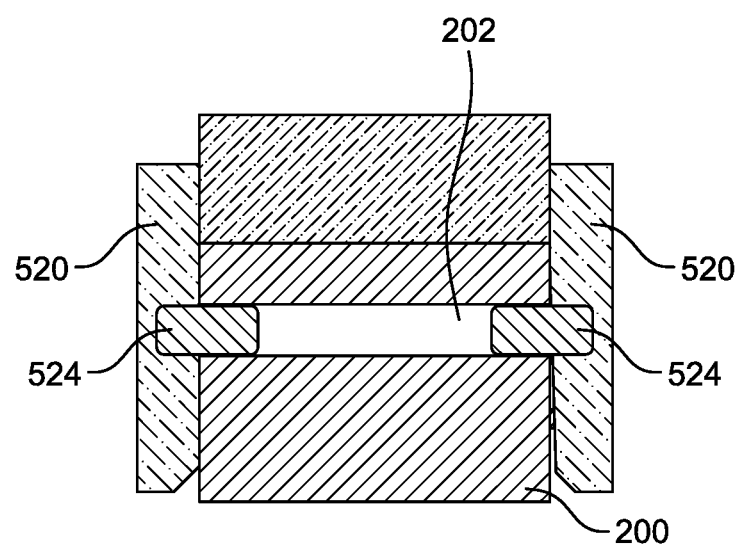
FIG. 4 is a sectional view of the first quick release endplate assembly showing the endplate in a pinched position.

An exemplary power swage tool 10 according to the present invention is illustrated in FIGS. 1 and 2. Swage tool 10 comprises power unit 100 connected to yoke 200. Power unit 100 transfers pressure from a pump into a vertical force that is transferred through a piston 102 into a die block 300. Yoke 200 connects to power unit 100 and holds upper and lower swage dies 400 and 402 in place. Yoke 200 opposes the force exerted by die block 300 and allows for a connector to be swaged. Die block 300 connects to piston 102 of power unit 100 and transfers the load exerted by power unit 100 into swage dies 400 and 402. Die block 300 holds lower swage die 402. Upper and lower swage dies 400 and 402 are the components that come into contact with the connector. Swage dies 400 and 402 convert vertical force from power unit 100 into a 360° radial swage on the connector. Upper endplates 500 hold upper swage die 400 in place in yoke 200, and lower endplates 502 hold lower swage die 402 in place in die block 300 so that they do not detach or dislodge during operation. Endplate screws 510 secure endplates 500 and 502 onto yoke 200 and die block 300.

Swivel assembly 600 connects to power unit 100 and allows for a hose that transfers pressure from the pump to power unit 100 to be moved around the bottom of power unit 100 in all directions, thereby providing for ease of use. Handle 700 attaches to power unit 100 and provides an easy and convenient location for an operator to hold power swage tool 10.

The present invention provides various improvements over previous power swage tools. Quick release endplates are provided to facilitate rapid changes between various swage die sizes and endplate sizes. Novel assemblies are provided to fix the yoke to the power unit and limit the possibility of the yoke sliding off the power unit. A yoke shroud keeps the two pieces of the yoke together in order to protect the operator and bystanders in the event of yoke failure. A sensor- or switch-based counter records and displays the number of swages the yoke and cylinder have undergone, allowing the customer and/or manufacturer to track swaging cycles and know when to service the tool. A rotating handle allows the operator to quickly remove and/or reposition the swage tool in the field, and allows for more orientations of the tool, thereby improving tool usability and operator comfort. A wireless control remotely actuates the tool in situations where the pump and operator of the tool are remotely located. A stand permits the operator to safely and stably set the swage tool down without need for disassembly. Swage die identification imprints identify on the swage connection itself the source of the swage die used to create the swage on the connector. A system to quickly identify various swage dies and sizes is also provided.

Quick Release Endplates

Upper endplates 500 hold upper swage die 400 in place on yoke 200, and lower endplates 502 hold lower swage die 402 in place on die block 300. One feature of the invention is that the endplates are provided in a quick release configuration to facilitate rapid changes between various swage die sizes and endplate sizes. Tooling changes without the use of tools such as screwdrivers is possible, which is advantageous since it saves operation time in the field. Workers in the field are often not carrying the tools required to make a conventional tooling changes. Ease of use for full tension applications is facilitated.

Figure 5A:
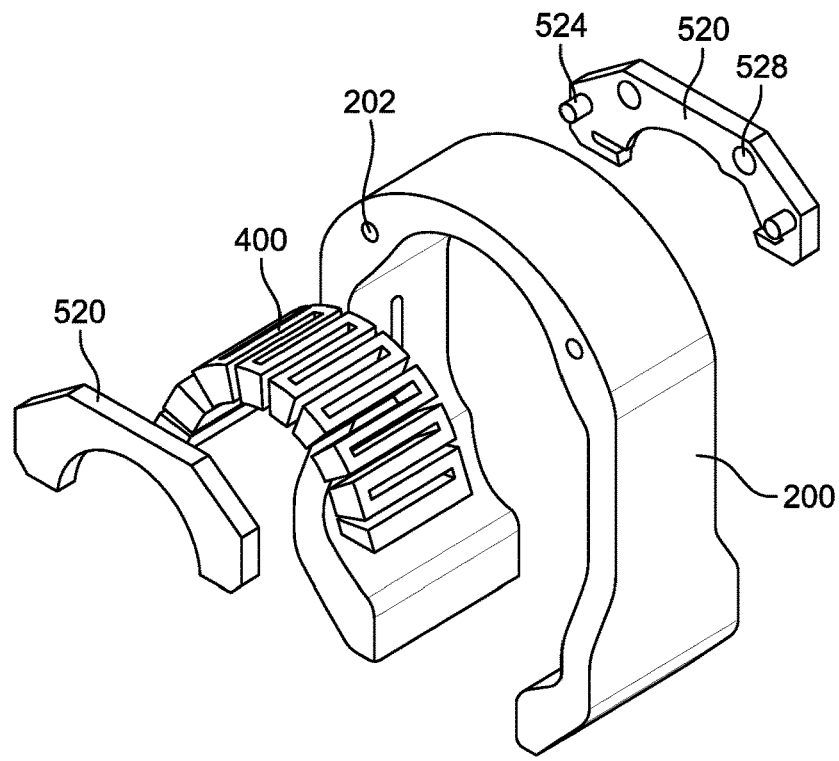
FIG. 5A is a disassembled, perspective view of the first quick release endplate assembly and a yoke.
Figure 5B:
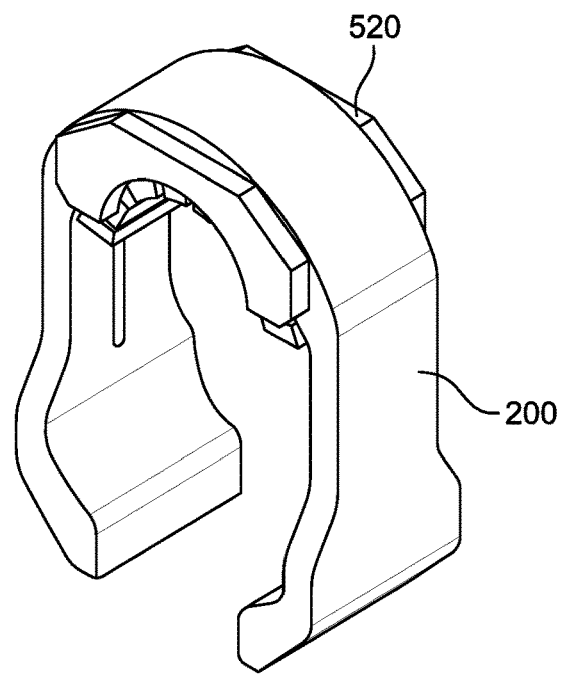
FIG. 5B is a perspective view showing the first quick release endplate assembly assembled onto the yoke.

A first quick release endplate assembly involving use of plastic endplates 520 is illustrated in FIGS. 3A-5B. Only upper endplates 520 are illustrated in FIGS. 3A-5B; the lower endplates would have an analogous configuration. Holes 522 are formed (such as by drilling) in endplates 520 for installation of locating pins 524, and holes 526 are formed for installation of magnetic disks 528. Endplates 520 also have a machined out channel for positioning and holding the swage during operation as well as standby use. Endplates 520 are assembled onto yoke 200 by sliding locating pins 524 into corresponding yoke holes 202 formed in yoke 200 (FIG. 5A). Magnets 528 installed in endplate holes 526 pull one of the endplates 520 towards yoke 200 and fix the endplate 520 into position against yoke 200. Swage die 400 is then held in place using one hand while the opposing side endplate 520 is installed. FIGS. 5A-5B show installation of endplates 520 on both sides of upper swage die 400 and yoke 200.

Locating pins 524 and magnets 528 serve multiple purposes. Locating pins 524 serve as indexers such that endplates 520 are maintained in the correct position and do not rotate. Magnets 528 provide holding strength against forces perpendicular to the faces of endplates 520, and locating pins 524 provide additional clamping strength in situations where dies 400 could possibly be knocked out or tilted. By minimizing the clearance of locating pins 524 within yoke holes 202 (FIG. 4), locating pins 524 pinch when an endplate 520 is subject to a rotating force, thereby locking the endplate 520 in yoke 200 and preventing dislodgment of the die 400 held within yoke 200 by endplates 520.

Figure 6A:
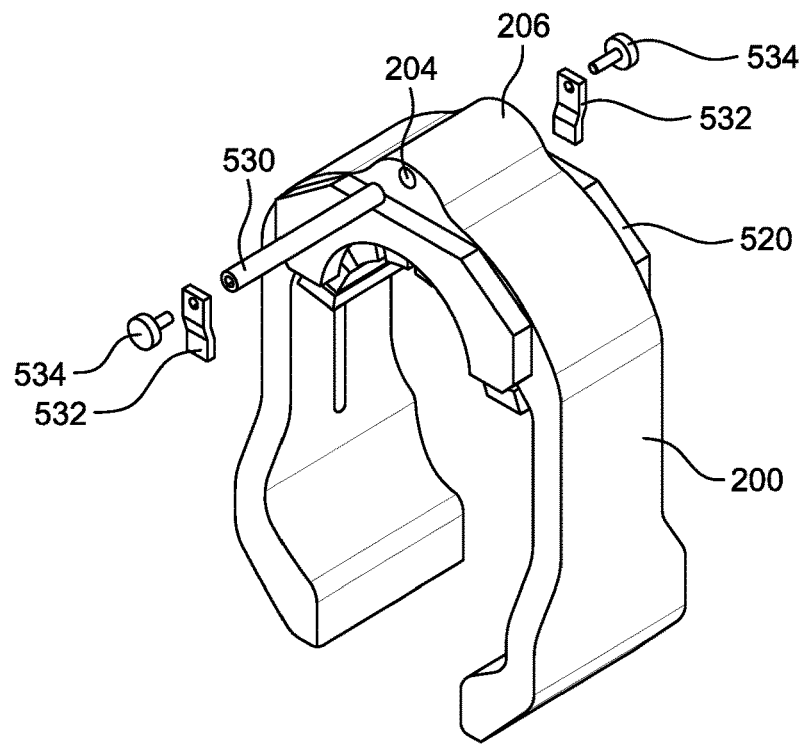
FIG. 6A is a disassembled, perspective view of a second quick release endplate assembly and a yoke.
Figure 6B:
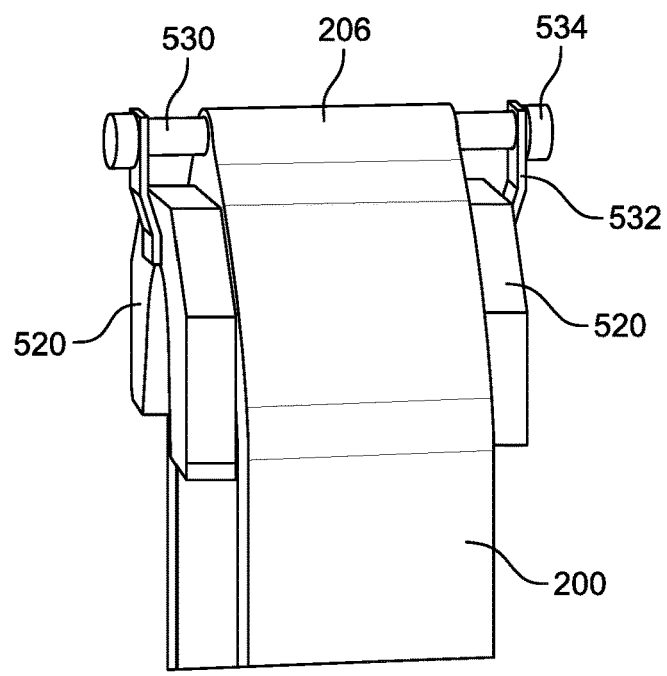
FIG. 6B is a perspective view of the second quick release endplate assembly assembled onto the yoke and swage die.
Figure 7A:
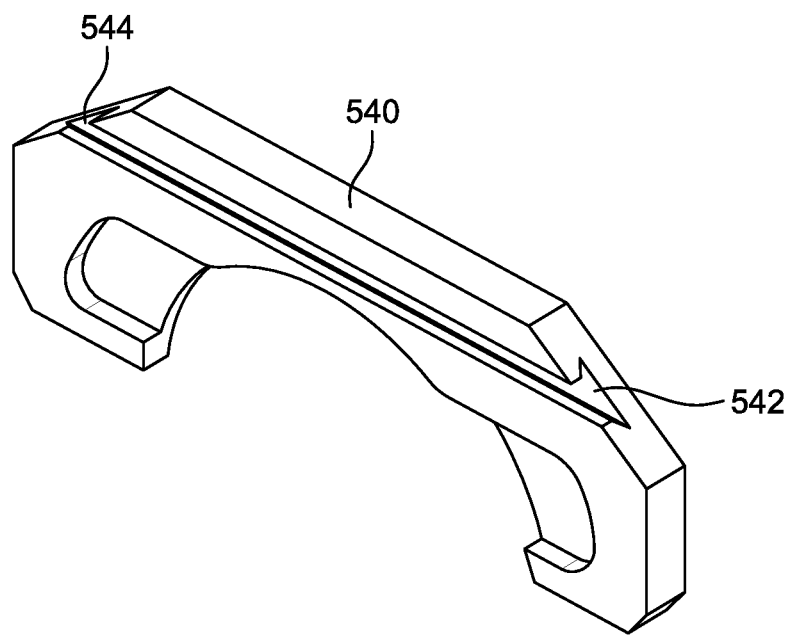
FIG. 7A is a perspective view of an endplate formed with a channel in a third quick release endplate assembly.
Figure 7B:
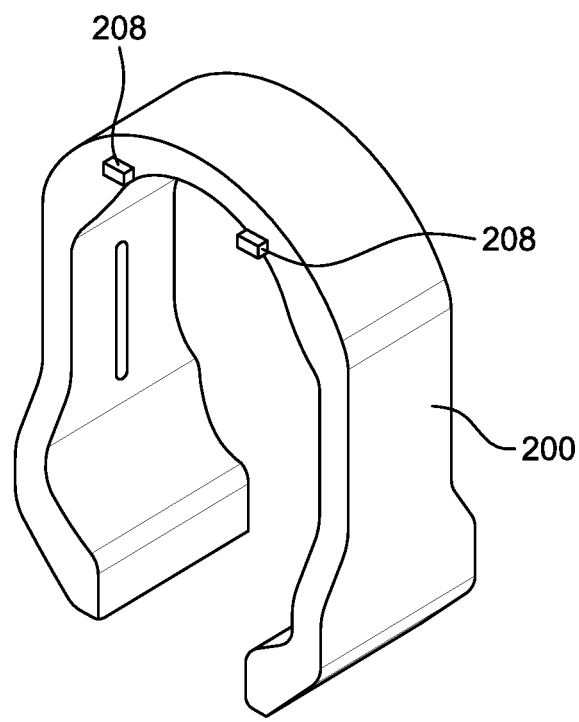
FIG. 7B is a perspective view of a yoke formed with protrusions that slide within the channel of the endplate of the third quick release endplate assembly.
Figure 8A:
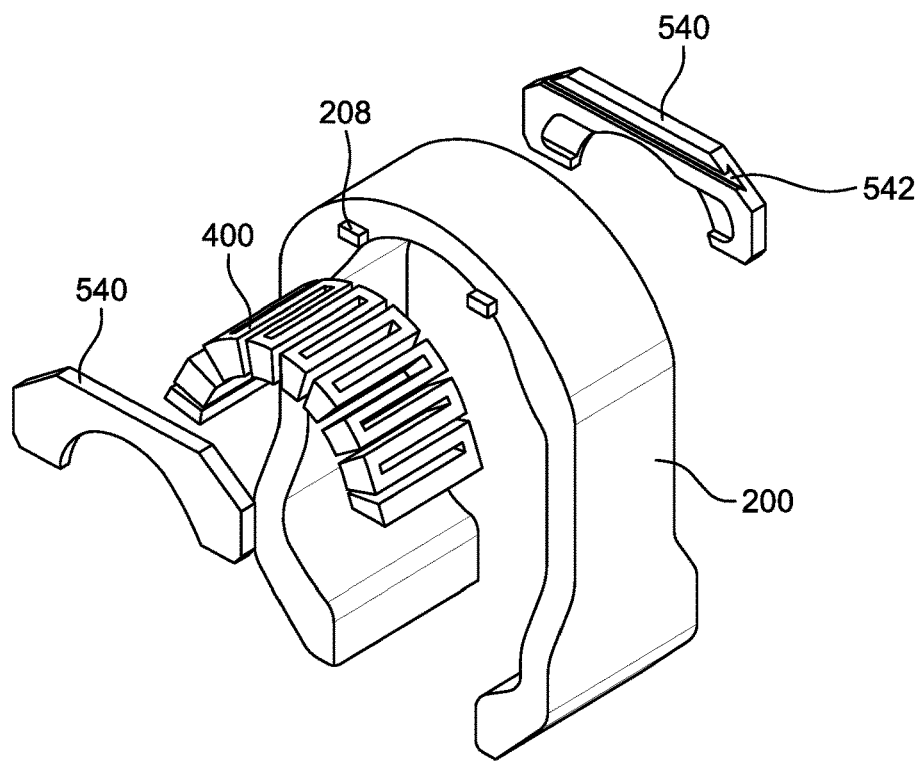
FIG. 8A is a disassembled, perspective view of the third quick release endplate assembly and yoke.
Figure 8B:
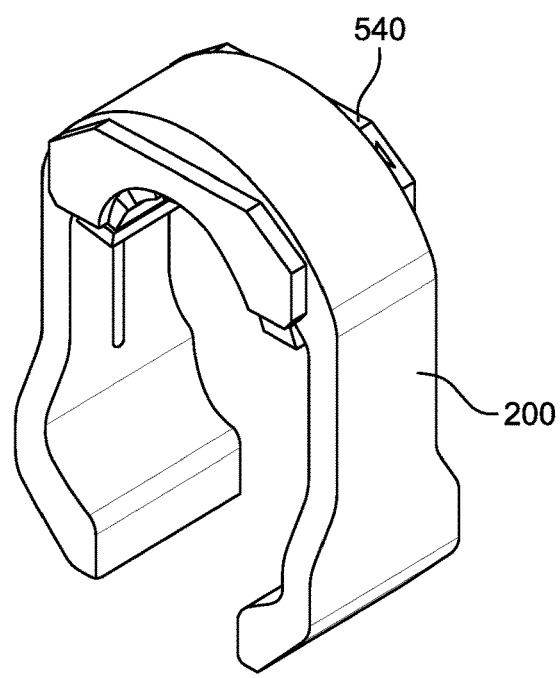
FIG. 8B is a perspective view of the third quick release endplate assembly assembled onto the yoke and swage die.

A second quick release endplate assembly is illustrated in FIGS. 6A-6B. The second quick release endplate assembly of FIGS. 6A-6B utilizes magnetic endplates 520 of the first quick release endplate assembly, with the addition of threaded standoff 530, bent clamp pieces 532 and threaded knobs 534. The second quick release endplate assembly provides extra clamping force in situations where the magnetic pull provided by magnetic endplates 520 may not be strong enough to hold endplates 520 to the yoke and die block in regular use. An additional yoke hole 204 is formed, such as by drilling, through a raised portion 206 at the top of yoke 200. Threaded standoff 530 is passed through yoke hole 204. Bent clamp pieces 532 are fixed to each end of standoff 530 by being pressed between the ends of standoff 530 and threaded knobs 534. Standoff 530 has sufficient clearance within yoke hole 204 to be easily rotated.

Bent clamp pieces 532 may be made out of sheet metal so that they have sufficient flexibility to be slightly opened to slide over endplates 520. This slight deformation fit of bent clamp pieces 532 over endplates 520 creates an increased holding force on endplates 520. In addition, endplates 520 may be formed with a slight recess for clamp pieces 532 to fit into such that the assembly does not rotate and does not become loose during operation.

A third quick release endplate assembly is illustrated in FIGS. 7A-8B. Endplates 540 of the third quick release endplate assembly are formed, such as by machining, with a groove or channel 542 on one side of the endplate. Protrusions 208 formed on the sides of the upper part of yoke 200 slide into channel 542 such that endplates 540 are held onto yoke 200 and hold swage die 400 within yoke 200. Protrusions 208 may be machined male channel tabs that protrude from the sides of yoke 200. Channel 542 includes a positive stop 544 at one end that allows endplate 540 to be easily slid to the correct position and alignment over protrusions 208. Channel 542 and protrusions 208 may be formed in any manner and with any shape that allows endplate 540 to be held onto yoke 200 in both the perpendicular and parallel directions relative to the yoke face.

A fourth quick release endplate assembly is illustrated in FIGS. 9A-10G. The fourth quick release endplate assembly includes four push pin assemblies 560 and two slotted dowel pins 576. Each push pin assembly 560 comprises a knob 562 connected to a shaft 564. Knob 562 facilitates rotation of push pin assembly 560 by the operator. Spring 570 and hollow cylindrical housing 572 are passed over shaft 564, with spring 570 being compressed between an interior shoulder at the front end of housing 572 and a raised shoulder 574 formed between shaft 564 and knob 562.

Figure 9A:
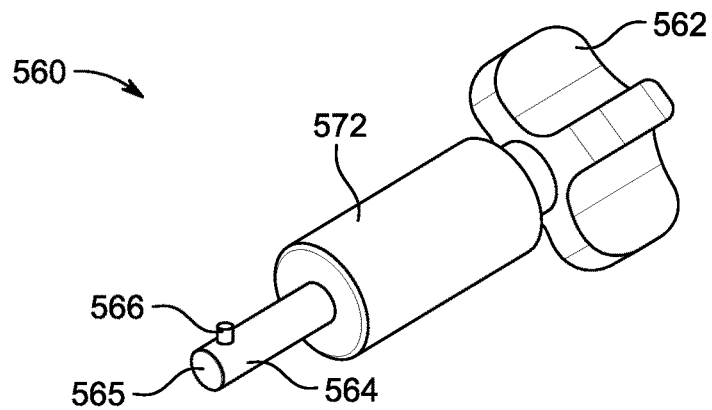
FIG. 9A is an assembled, perspective view of a push pin assembly of a fourth quick release endplate assembly.
Figure 9B:
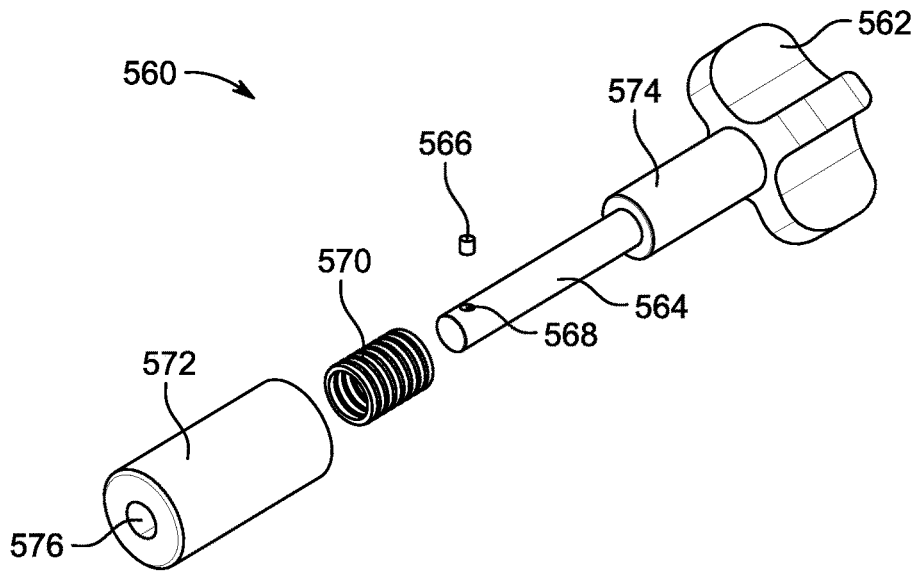
FIG. 9B is a disassembled, perspective view of the push pin assembly.

When spring 570 and cylindrical housing 572 are installed on shaft 564 in this manner, front end 565 of shaft 564 passes through hole 571 formed at one end of cylindrical housing 572, and protrudes from housing 572 to form the forward portion of push pin assembly 560 (FIG. 9A). Locking pin 566 is then inserted into corresponding hole 568 formed near front end 565 of shaft 564. Locking pin 566, when inserted into hole 568, extends in a direction perpendicular to the axis of shaft 564. In operation, locking pin 566 acts as a stopper and locking mechanism in conjunction with slotted dowel pin 576.

Figure 9C:
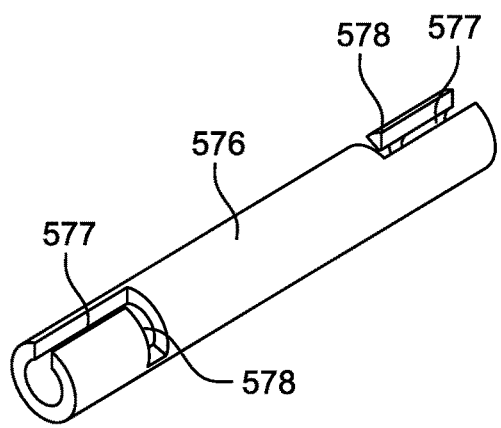
FIG. 9C is a perspective view of a slotted dowel pin of the fourth quick release endplate assembly.

As illustrated in FIG. 9C, slotted dowel pin 576 is a hollow, cylindrical structure that is open at both ends. Slots 577 are formed though the sidewall of pin 576 and extend in an axial direction from each open end of dowel pin 576. Locking grooves 578 are formed at the ends of slots 577 and extend perpendicular to slots 577 in a circumferential direction of pin 576. Together, slot 577 and locking groove 578 have an L-shaped configuration.

Figure 10A:
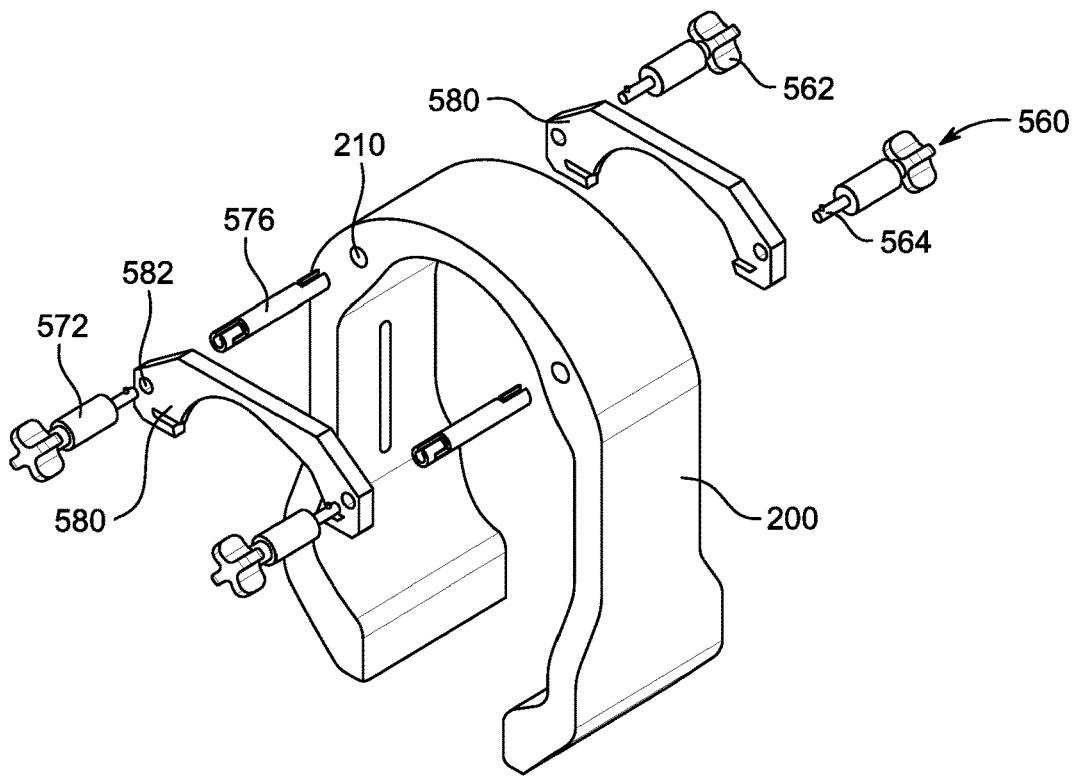
FIG. 10A is a disassembled, perspective view of the fourth quick release endplate assembly and a yoke.
Figure 10B:
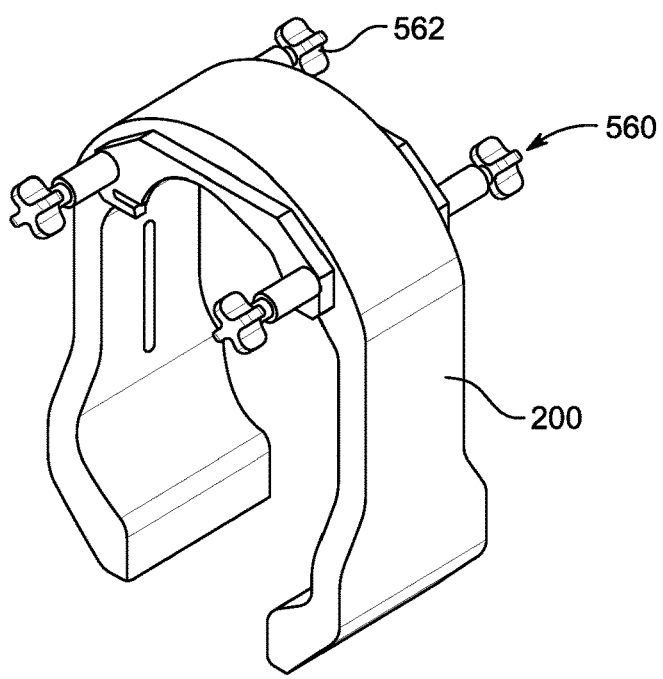

As shown in FIGS. 10A-B, slotted dowel pins 576 are pressed into corresponding holes 210 formed in the top side portions of yoke 200. Then, the portion of shaft 564 protruding from push pin assembly 560 is inserted through holes 582 formed in endplates 580. Insertion of shaft 564 continues into dowel pin 576 by aligning pin locking pin 566 with slot 577 formed in dowel pin 576, such that locking pin 566 is able to slide through slot 577. Once locking pin 566 has reached locking groove 578 at the end of slot 577 and stops, knob 562 is rotated, which moves locking pin 566 through locking groove 578 and locks push pin assembly to endplates 580, yoke 200 and swage die 400 (not shown). Spring 570 is compressed and pushes cylindrical housing 572 against endplate 580, holding it in place. Endplate 580 is easily removed by compressing and rotating push pin assembly 560 in the reverse direction, such that locking pin 566 moves back into alignment with slot 577 and can be retracted from dowel pin 576.

Figure 11A:
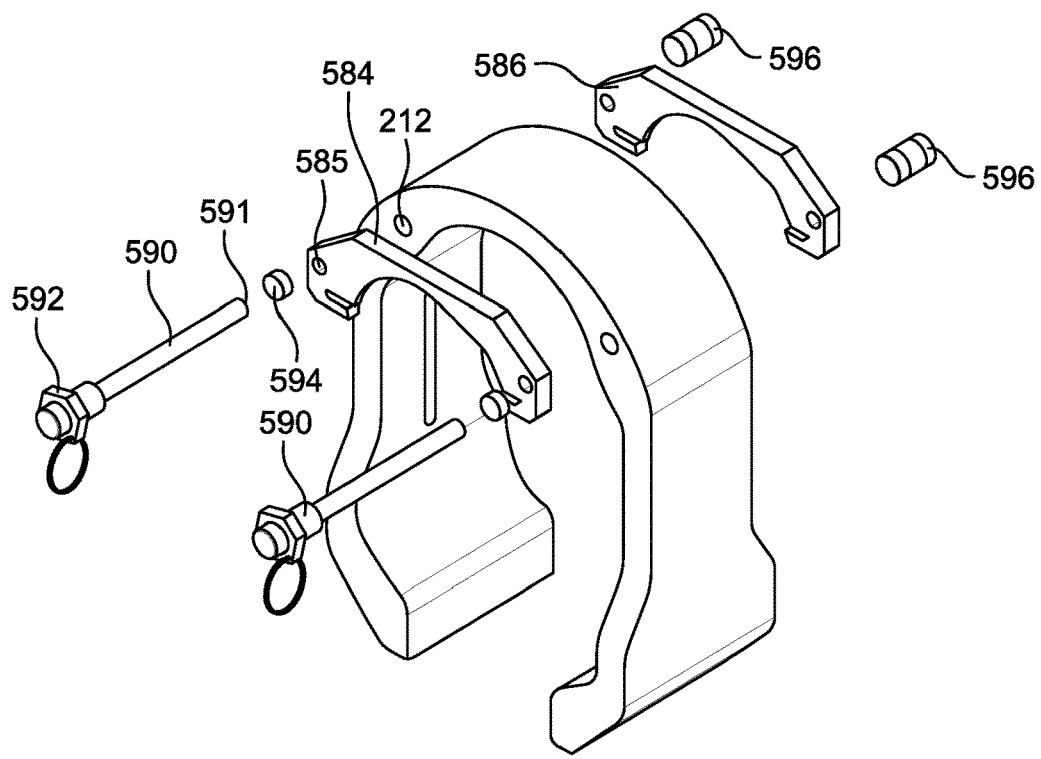
FIG. 11A is a disassembled, perspective view of a fifth quick release endplate assembly and a yoke.
Figure 11B:
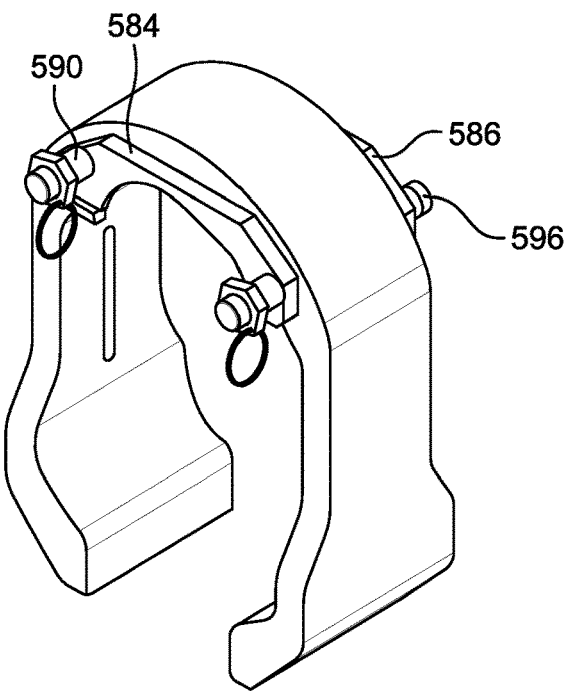
FIG. 11B is a perspective view of the fifth quick release endplate assembly assembled onto the yoke.

A fifth quick release endplate assembly is shown in FIGS. 11A-11B. The fifth quick release endplate assembly includes two push button quick release pins 590, retaining caps 596, and first and second endplates 584 and 586. The fifth quick release endplate assembly includes two distinctive endplates: first endplate 584 includes through holes 585 through which quick release pins 590 are inserted through and into holes 212 formed in yoke 200, and second endplate 586 that includes appropriately-sized recesses for receiving retaining caps 596.

To assemble endplates 584 and 586 onto yoke 200, push button 592 on push pin 590 is pressed in order to retract push pin 591 at the end of push pin 590, and push pin 590 is then slid through hole 585 in first endplate 584, through channel 512 formed through yoke 200, and into retaining cap 596 that is recessed into second endplate 586. Push button 592 is then released such that push pin 591 extends into and engages retaining cap 596 to secure the assembly. For disassembly, button 592 is pressed to retract push pin 591 from retaining cap 596, and push pin 590 is retracted from endplates 584, 586 and yoke 200.

Spring 594 may be provided over the shaft of quick release pin 590 to minimize any gaps between the endplates, yoke and quick release pins, thereby providing a stronger hold. Spring 594 is compressed between the button end of pin 590 and first endplate 584 to create a strong clamping force. Spring 594 also eases disassembly by causing push pin 590 to "pop" back when button 592 is pressed and push pin 591 is disengaged from retaining cap 596. In this manner, the chances of improper assembly are minimized since spring 594 will cause push pin 590 to retract if push pin 590 is not correctly engaged with retaining cap 596.

Fixing of Yoke to Power Unit

Power unit 100 provides the driving force through piston 102 and die block 300, which holds lower swage die 402, to perform the act of swaging. Yoke 200 is slid onto power unit 100, holds upper swage die 400, and contains the force output by power unit 100. In conventional power swage tools, the yoke is held onto the power unit by use of detent balls in the die block that slide in a groove in the yoke. During rough handling, however, the yoke may sometimes slide off of the power unit and cause the yoke and/or power unit to fail. Another feature of this invention are various assemblies for more securely fixing the yoke to the power unit. The yoke is fixed to the power unit such that the power tool can be efficiently handled and transported without the yoke sliding off the power unit.

Figure 12A:
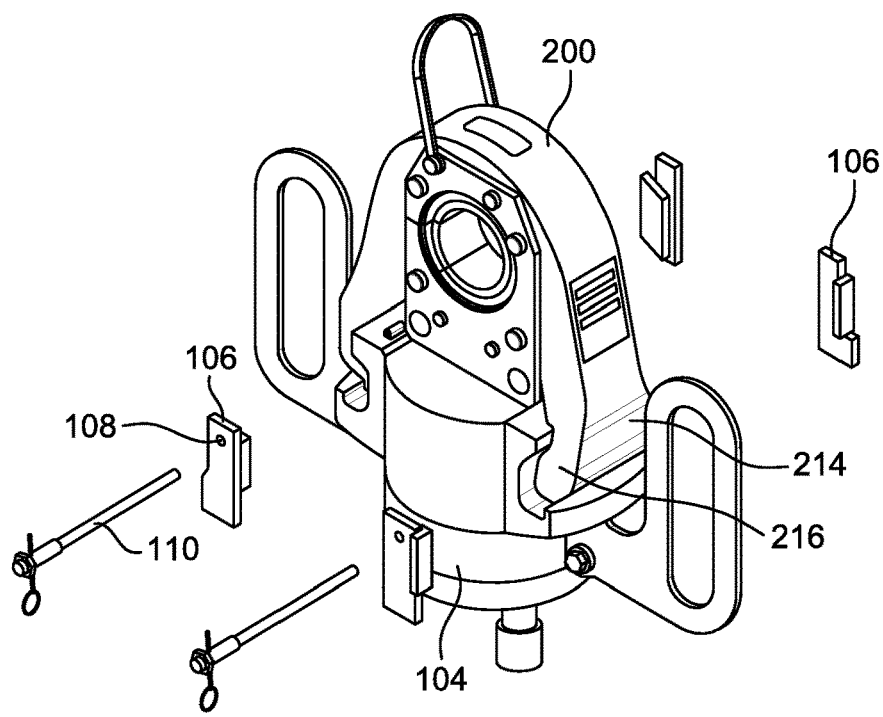
FIG. 12A is a disassembled, perspective view of a locking pin assembly for fixing a yoke to a power unit.
Figure 12B:
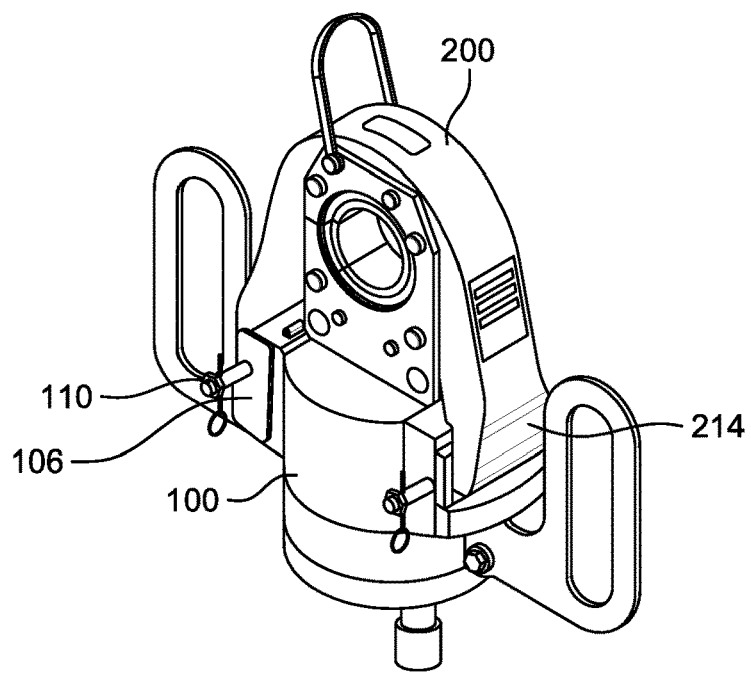
FIG. 12B is a perspective view of the yoke fixed to the power unit by the assembly of FIG. 12A.
Figure 13A:
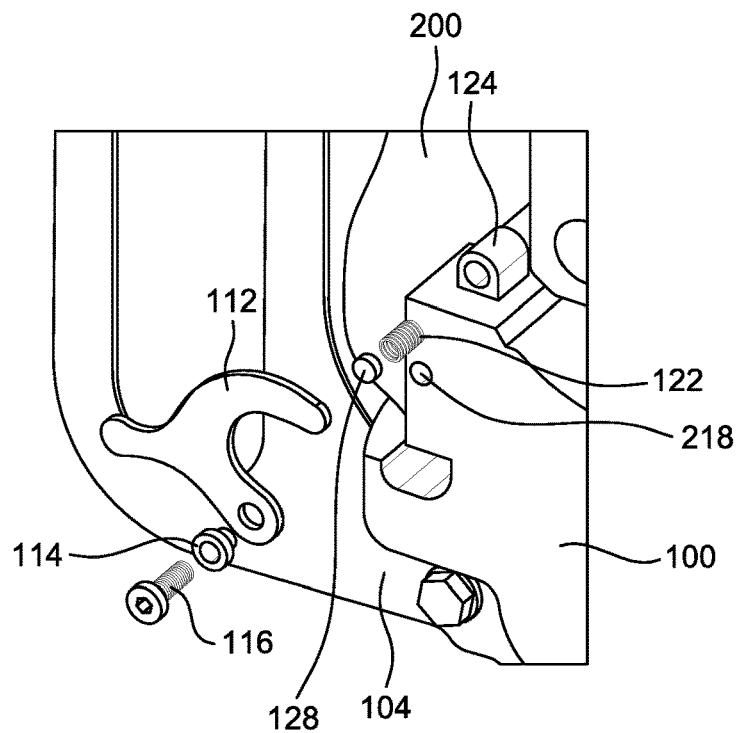
FIG. 13A is a disassembled, perspective view of a rotating locking tab assembly for fixing a yoke to a power unit.
Figure 13B:
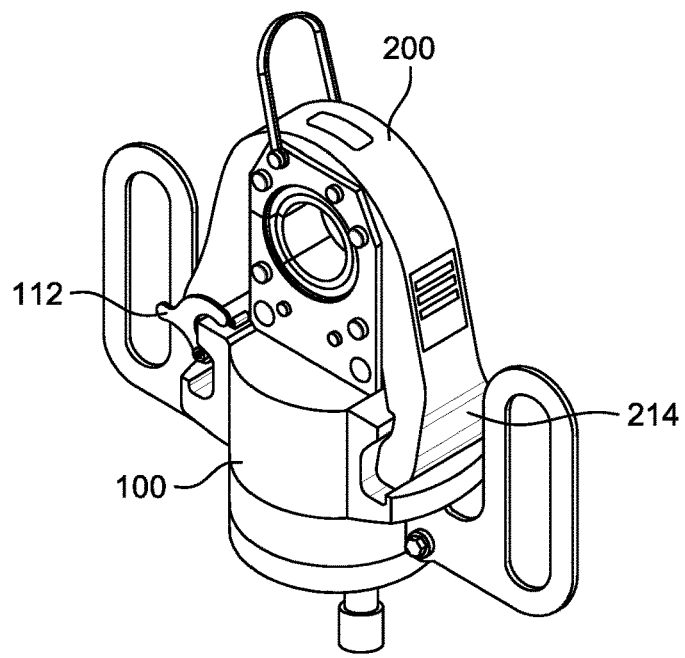
FIG. 13B is a perspective view of the yoke fixed to the power unit by the rotating locking tab assembly of FIG. 13A.

A first assembly for fixing the yoke to the power unit is shown in FIGS. 12A-12B. The lower ends or "ears" 214 of yoke 200 have a contoured shape that matches correspondingly contoured channels or cavities 104 on the sides of power unit 100, such that yoke 200 can be slid onto power unit 100 from the side by moving yoke ears 214 through channels 104. Metal inserts 106 are also contoured to match the profile of yoke ears 214. Metal inserts 106 include through holes 108 that are aligned with holes 216 formed in yoke 200. Locking pins 110 extend through holes 216 in yoke ears 214 and metal inserts 106 on both sides of yoke ears 214 in order to lock yoke 200 onto power unit 100. All of metal inserts 106 can be floating (i.e. not rigidly attached to the yoke and power unit), or some of the inserts such as the back inserts can be rigidly attached by welding, screws or adhesion.

Figure 14A:
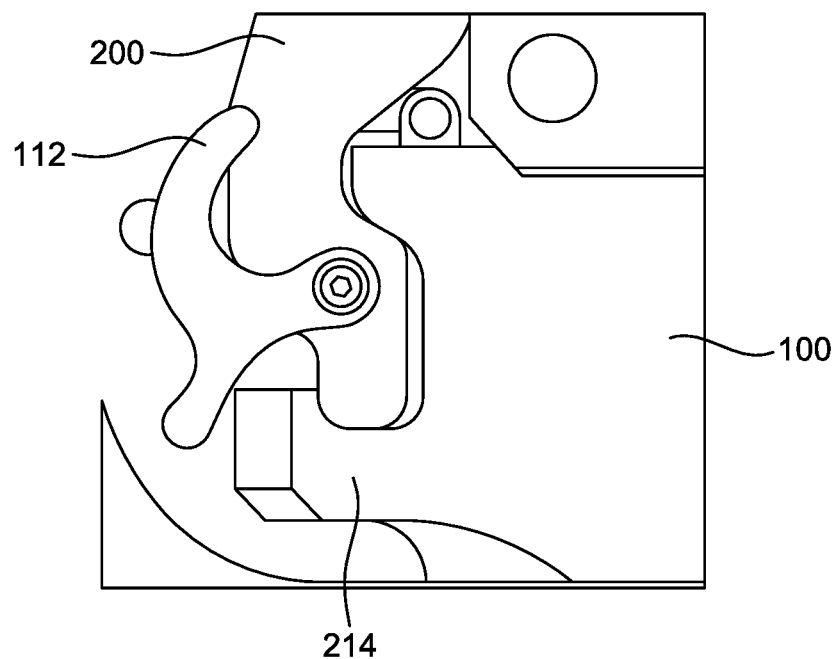
FIG. 14A is a side view showing the locking tab of FIG. 13A in an open position.
Figure 14B:
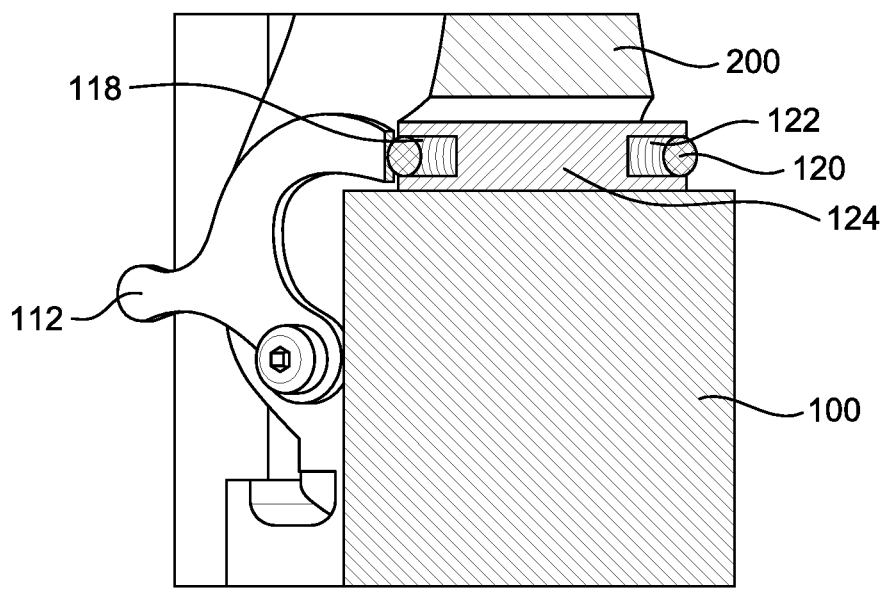
FIG. 14B is a perspective view showing the locking tab of FIG. 13A in a locked position.
Figure 15:
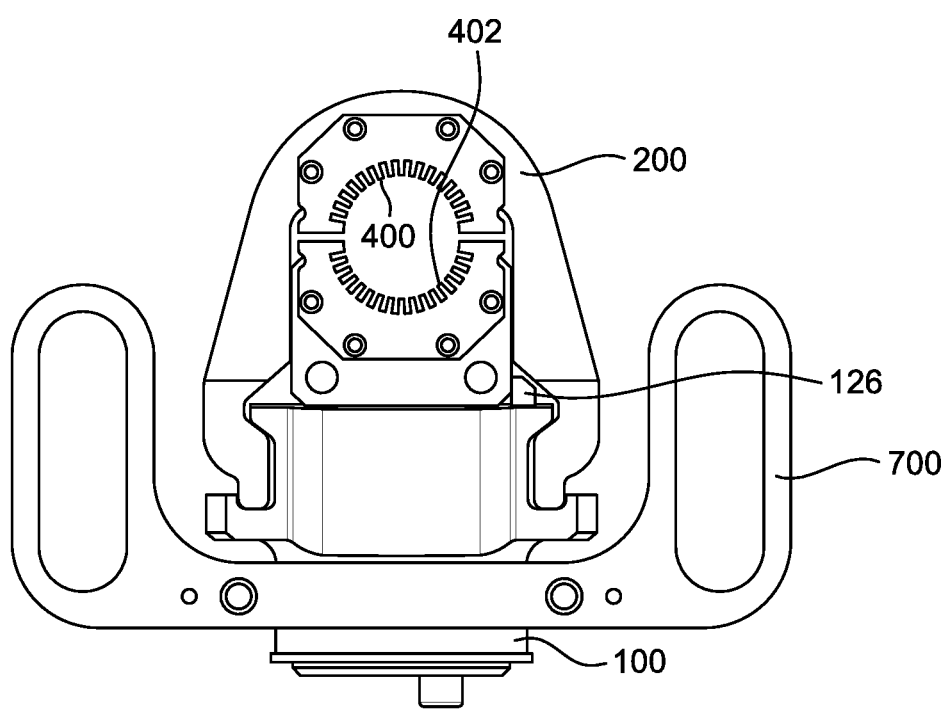
FIG. 15 is a side view of a rotating locking block assembly for fixing a yoke to a power unit.
Figure 16A:
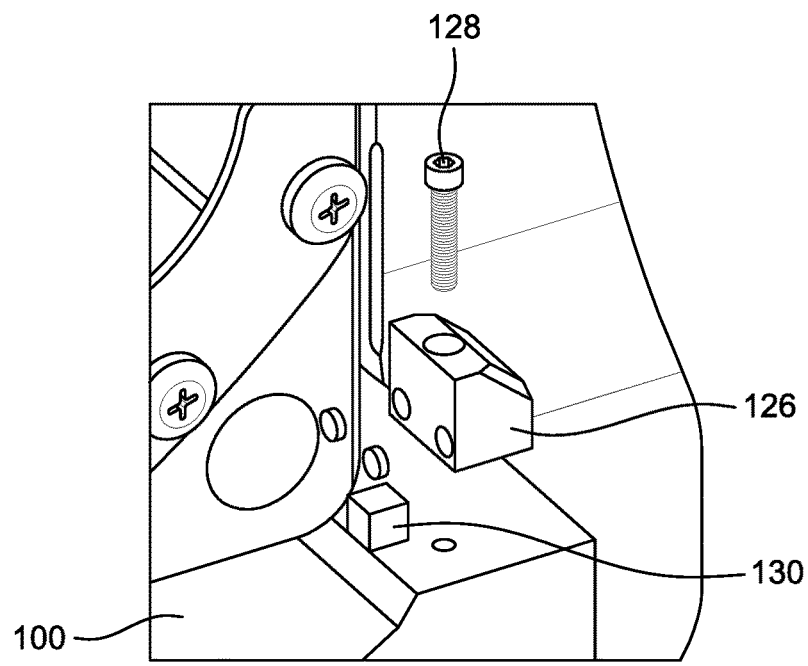
FIG. 16A is a disassembled, perspective view of the rotating locking block assembly of FIG. 15.
Figure 16B:
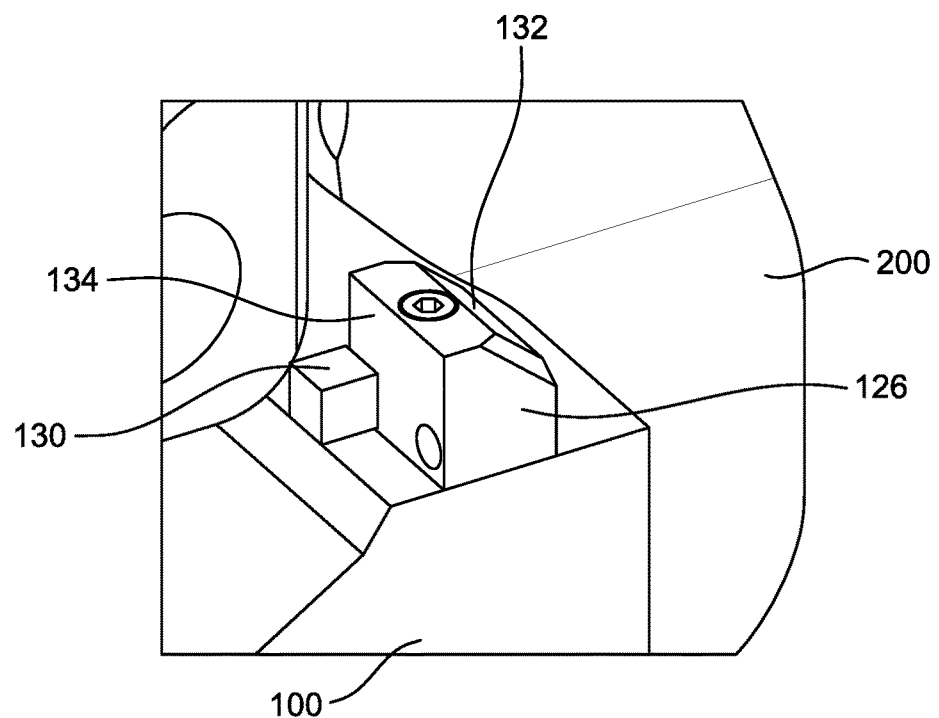
FIG. 16B is a perspective view showing the rotating locking block assembly fixed to the top of the power unit in an unlocked position.

A second assembly for fixing the yoke to the power unit is shown in FIGS. 13A-14B. Metal locking tab 112 rotates around bushing 114 and screw 116 that are screwed through a threaded hole 218 formed in the side of yoke ear 214. Yoke 200 is slid onto power unit 100 (yoke ears 214 slide through channels 104) with locking tab 112 rotated to an open or unlocked position (FIG. 14A). Once yoke 200 is in place on power unit 100, locking tab 112 is rotated into a locked position (FIGS. 13B, 14B). In the locked position, locking groove 118 formed on the yoke-facing side of locking tab 112 lines up with a compressed detent ball assembly (ball 120 and spring 122 received in assembly 124) that is attached to the top of power unit 100.

Figure 17A:
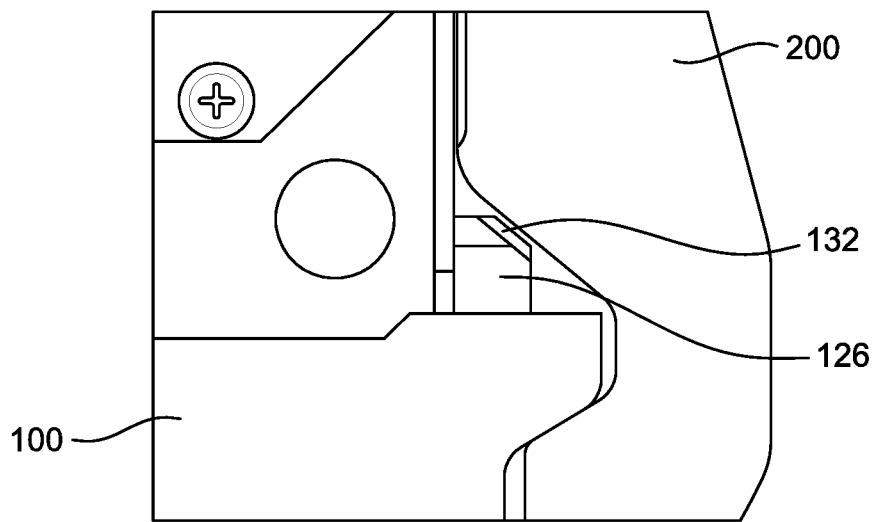
FIG. 17A is a side view showing the rotating locking block assembly in an unlocked position.
Figure 17B:
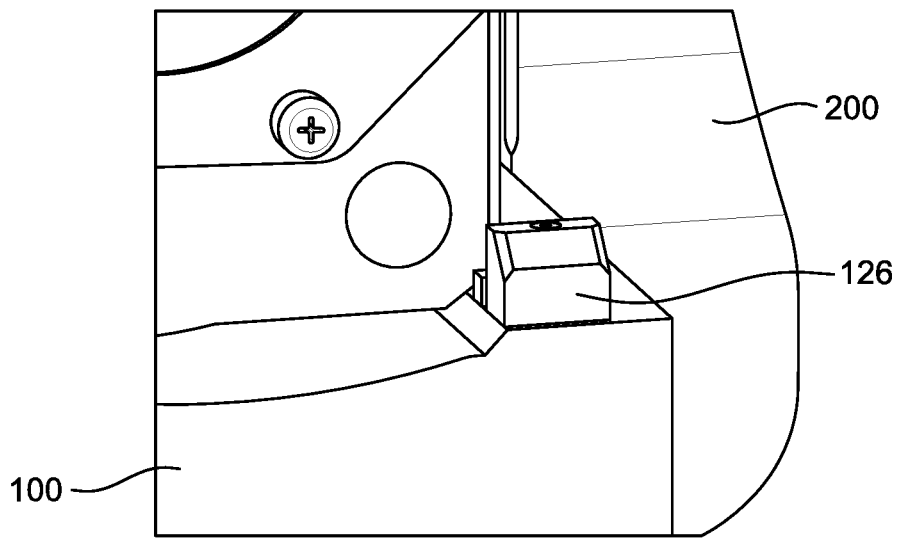
FIG. 17B is a perspective view showing the rotating locking block assembly in a locked position.

A third assembly for fixing the yoke to the power unit is shown in FIGS. 15-17B. Locking block 126 is screwed into the top of power unit 100 and is able to rotate about screw 128. The geometry of block 126 allows yoke 200 to slide onto power unit 100 when block 126 is in the open or unlocked position (FIGS. 15, 16B, 17A), and restricts yoke 200 from being removed from power unit 100 when it is rotated to the closed or locked position (FIG. 17B). In particular, inclined face 132 of block 126 faces a correspondingly contoured interior face of yoke 200 and allows yoke 200 to slide by without interference in the unlocked position (FIG. 16B). Locking block 126 is rotated about screw 128 to the locked position in which locking face 134 faces the sides of yoke 200 (FIG. 17B), thereby preventing removal of yoke 200 from power unit 100.

Positive stop 130 attached to power unit 100 engages locking face 134 of locking block 126 in both the locked and unlocked positions to ensure that block 126 is rotated to the correct position. Magnets may be embedded into rotating block 126 to ensure that block 126 does not accidentally rotate while the power tool is in use. Such embedded magnets will hold block 126 in its position in both the locked and unlocked positions.

Yoke Shroud

Another feature of the invention is a yoke shroud that keeps broken pieces of the yoke together in order to protect the operator and bystanders from flying debris in the event of yoke failure. The shroud works by clamping down on both ends of the yoke and keeping the broken pieces of the yoke together when the yoke fails. Compressive forces developed by the shroud safely dissipate energy released during yoke failure through friction, helping to protect both the tool and bystanders.

Figure 18:
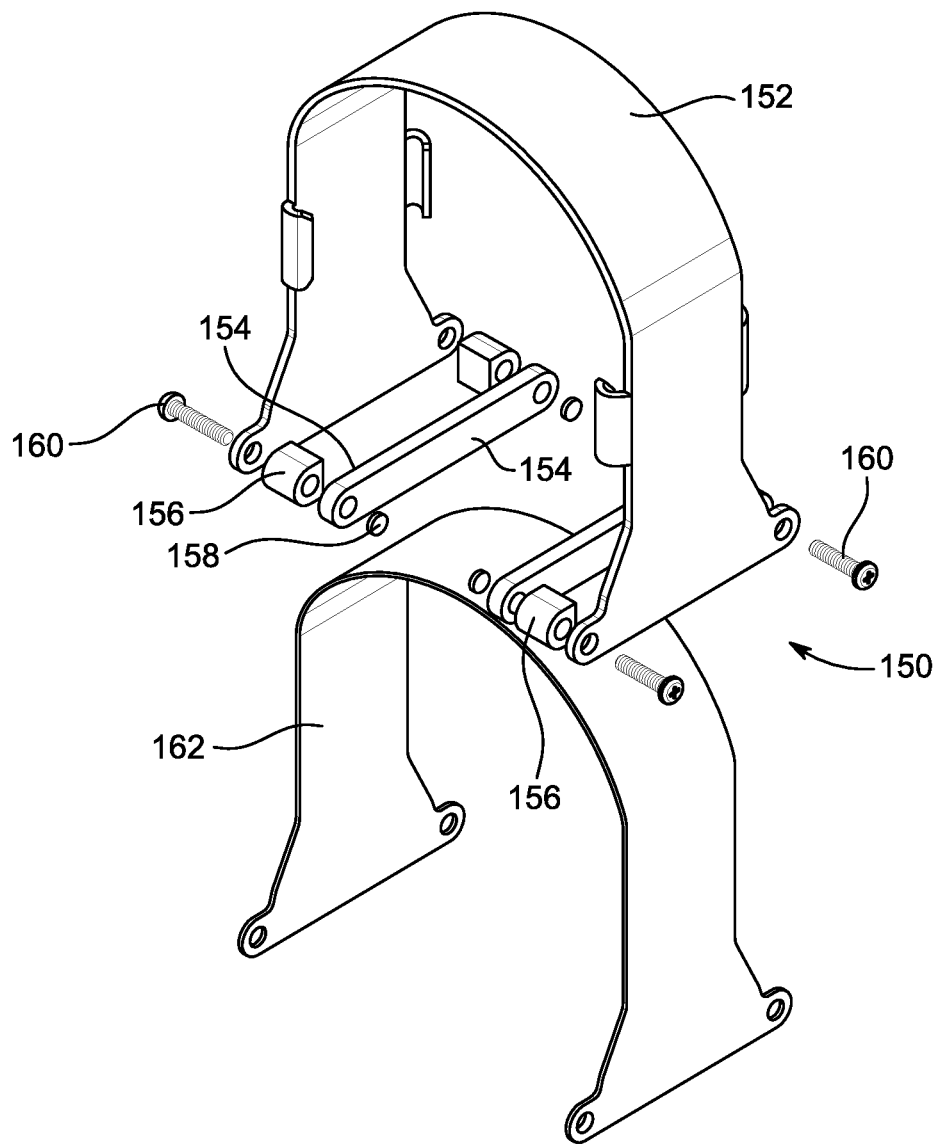
FIG. 18 is a disassembled, perspective view of a yoke shroud assembly.
Figure 19A:
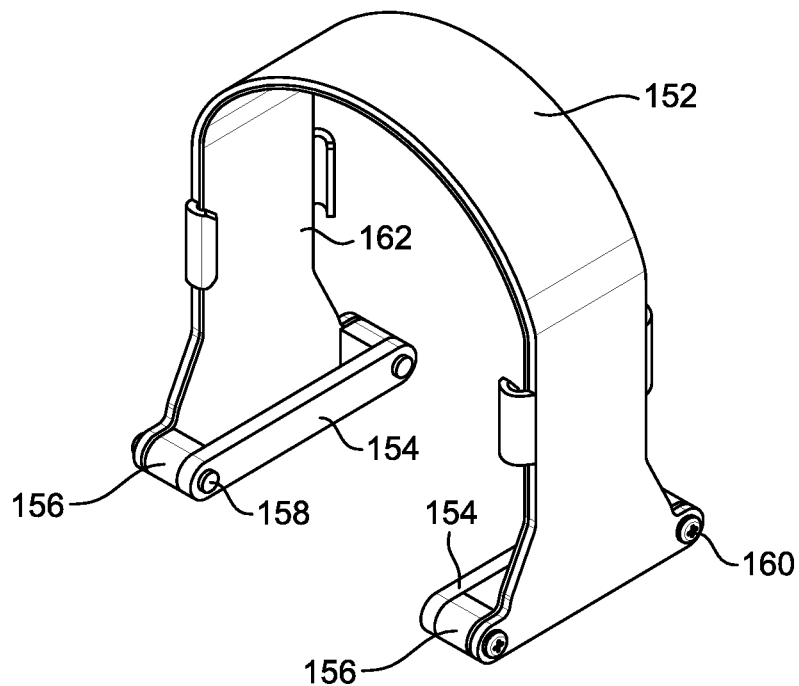
FIG. 19A is an assembled, perspective view of the yoke shroud assembly.
Figure 19B:
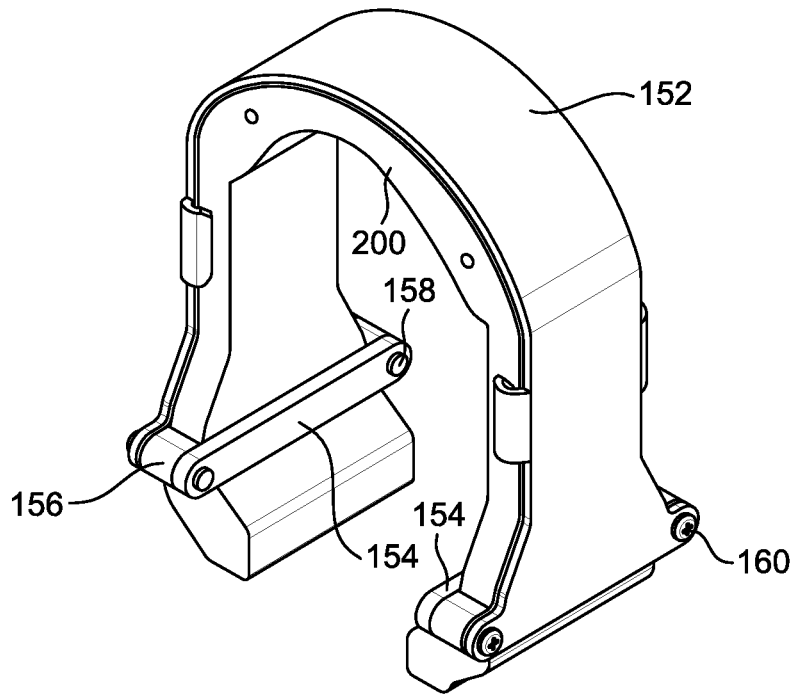
FIG. 19B is a perspective view showing the yoke shroud assembly assembled onto a yoke.
Figure 20:
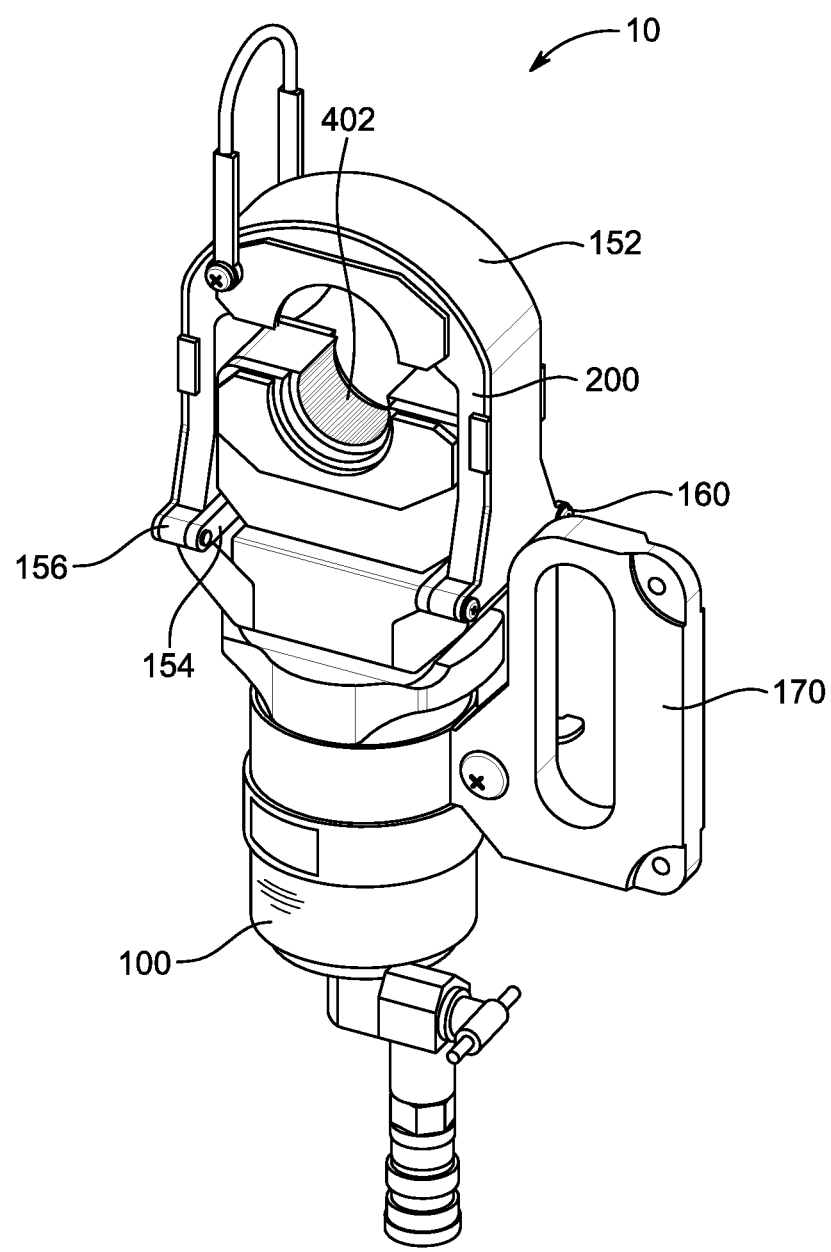
FIG. 20 is a perspective view of the power tool with the yoke shroud assembly installed.

Yoke shroud assembly 150 is illustrated in FIGS. 18-20. Yoke shroud assembly includes a bent sheet metal shroud 152 that is contoured to fit closely around the outward-facing surfaces of yoke 200 (FIG. 19B). Shroud 152 is attached to yoke 200 by hardware at the bottom ends of shroud 152. In particular, bracket 154, spacers 156, nuts 158 and screws 160 secure yoke shroud assembly 150 to yoke 200. Bracket 154 is oriented against an inside surface of yoke 200, opposite shroud 152 which is oriented around the outside surface of yoke 200. Bracket 154 features a convex mating surface that applies normal compressive pressure on the correspondingly contoured concave yoke surface on the inside of yoke 200. Spacers 156 allow bracket 154 to be compressed against yoke 200. Screws 160 are passed through shroud 152, spacers 156 and brackets 154 to tighten the assembly. Rubber liner 162 may also be positioned between shroud 152 and yoke 200 to further facilitate in compression of the assembly and to keep dirt and debris out of the assembly.

Figure 21:
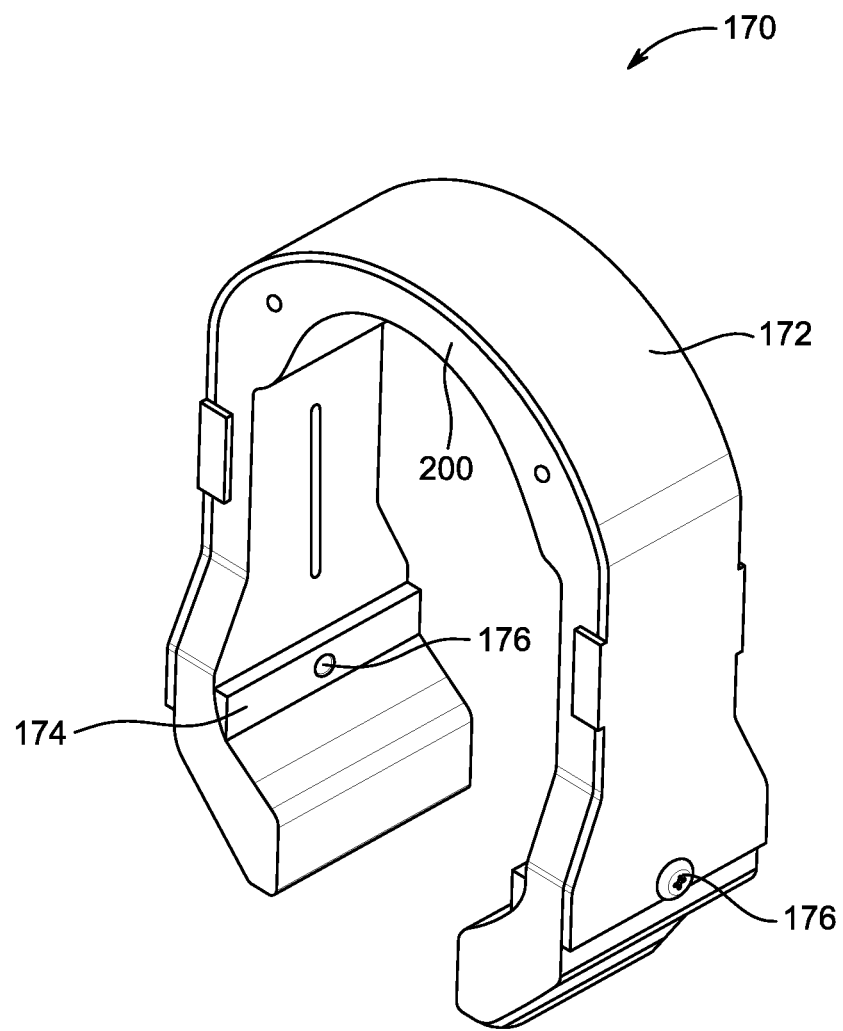
FIG. 21 is a perspective view of an alternative yoke shroud assembly assembled onto a yoke.

An alternative yoke shroud assembly 170 is shown in FIG. 21. Yoke shroud 172 is secured to yoke 200 by bolt 176 that passes through corresponding bolt holes formed in yoke 200 and bracket 174.

Counter

Another feature of the invention is a sensor- or switch-based counter that records and displays the number of swages the yoke and cylinder have undergone, allowing the customer and/or manufacturer to track swaging cycles and to know when to service the tool. A service plan for the tool can be developed based on tool life, and it will be evident simply by viewing the counter on the tool exactly how many cycles the tool has undergone.

Figure 22:
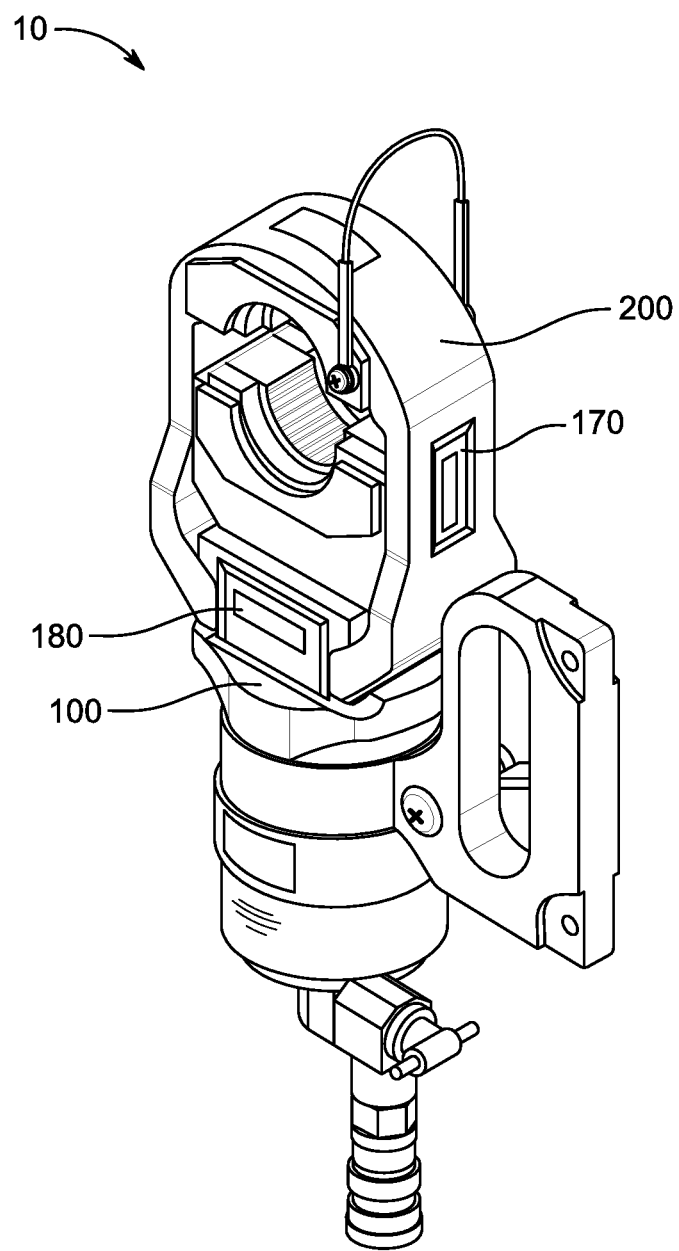
FIG. 22 is a perspective view of a power tool showing exemplary locations of a digital counter.

FIG. 22 shows several possible locations of a digital counter in power tool 10. In particular, a digital counter 170 may be incorporated into yoke 200, and/or a digital counter 180 may be incorporated into the cylinder of power unit 100. The digital counter records every swage that is performed by tool 10 by receiving an electronic signal from a sensor, mechanical transducer or mechanical switch somewhere in the tool. Examples of appropriate cycle sensing mechanisms include, without limitation, piezo electric sensors, capacitive sensors, proximity sensors, contact switches (either normally open or normally closed) and pressure sensors. The counter can store and display both a cumulative count of total cycles and the number of cycles since the tool was last services, with a user able to switch between the display types using a button or other appropriate mechanism on the counter. The counter indicates when the tool is due for service, such as by an indicator light, service code or any other appropriate indicator mechanism. GPS tracking may also be incorporated into the counter module. Data collected by the counter may be downloaded to a computer or smart phone application by a wired or wireless connection.

Figure 23A:
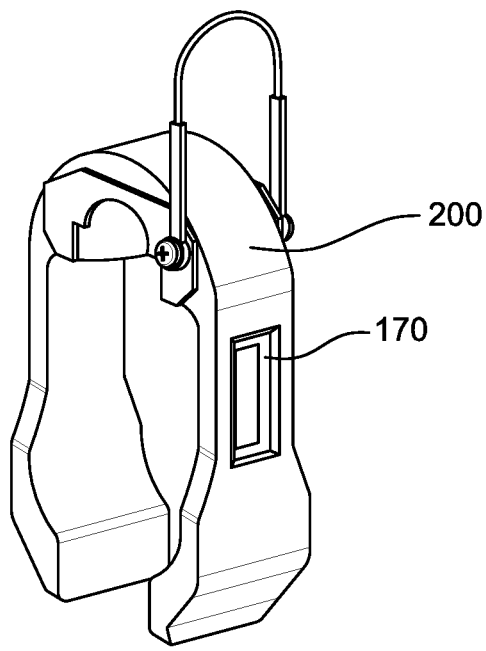
FIG. 23A is a perspective view of a counter recessed into a pocket in a yoke.
Figure 23B:
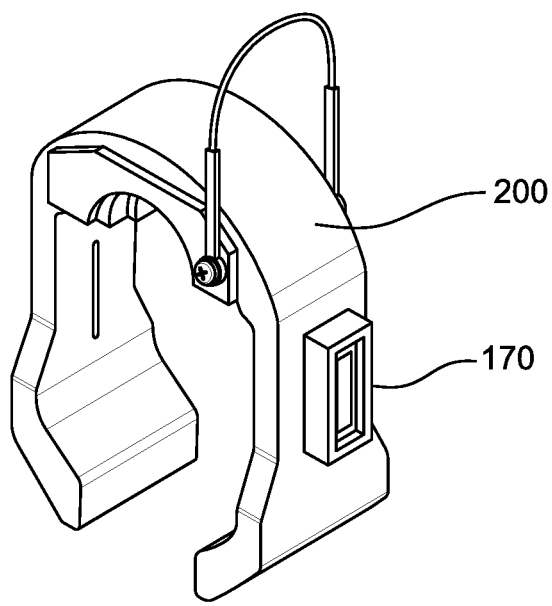
FIG. 23B is a perspective view of a counter surface mounted onto a yoke.
Figure 24:
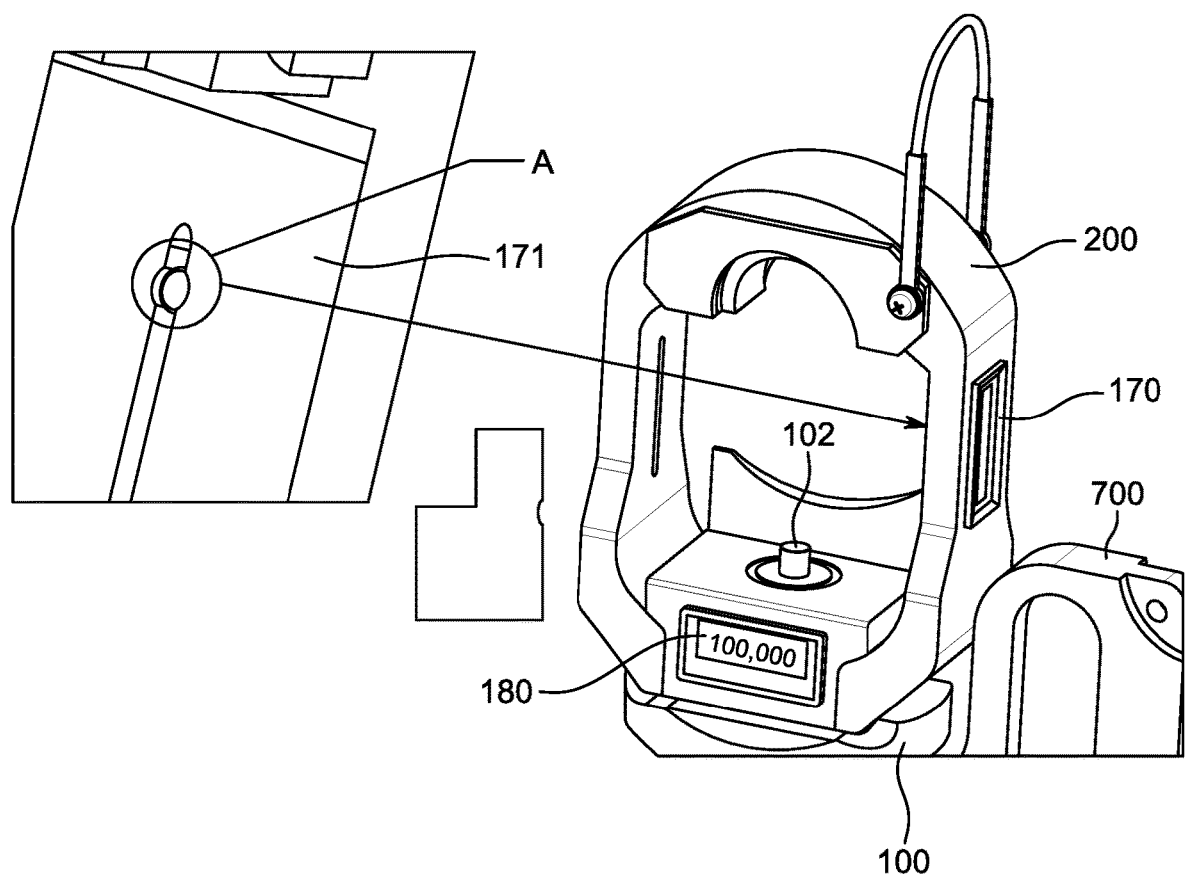
FIG. 24 is a perspective view showing a counter and contact switch implemented in a yoke.

As mentioned above, one possible orientation of the counter in the power tool is incorporation into yoke 200. As shown in FIG. 23A, digital counter 170 may be recessed into a pocket on the side of yoke 200. Alternatively, as shown in FIG. 23B, digital counter 170 may be surface mounted on yoke 200. In one implementation, when switch 170 is incorporated into yoke 200, a contact switch 171 may be embedded in the side of the yoke, either opposite of counter 170 or directly behind counter 170 (FIG. 24). Contact switch 171 may be contacted by ball detents of die block 300, for example, when die block 300 is in contact with yoke 200 during a swage operation. Switch 171 may be connected to counter 170 by wired or wireless connection. Each time a swage is made, switch 171 sends an electric signal to counter 170 and the event is stored in nonvolatile memory of counter 170. Counter 170 is powered by an onboard battery, such as a dry cell battery, and features low power consumption circuitry to ensure a long battery life, preferably 1-5 years. Alternative switch or sensor implementations are suitable so long as they are able to detect die block movement and contact with yoke.

Figure 25:
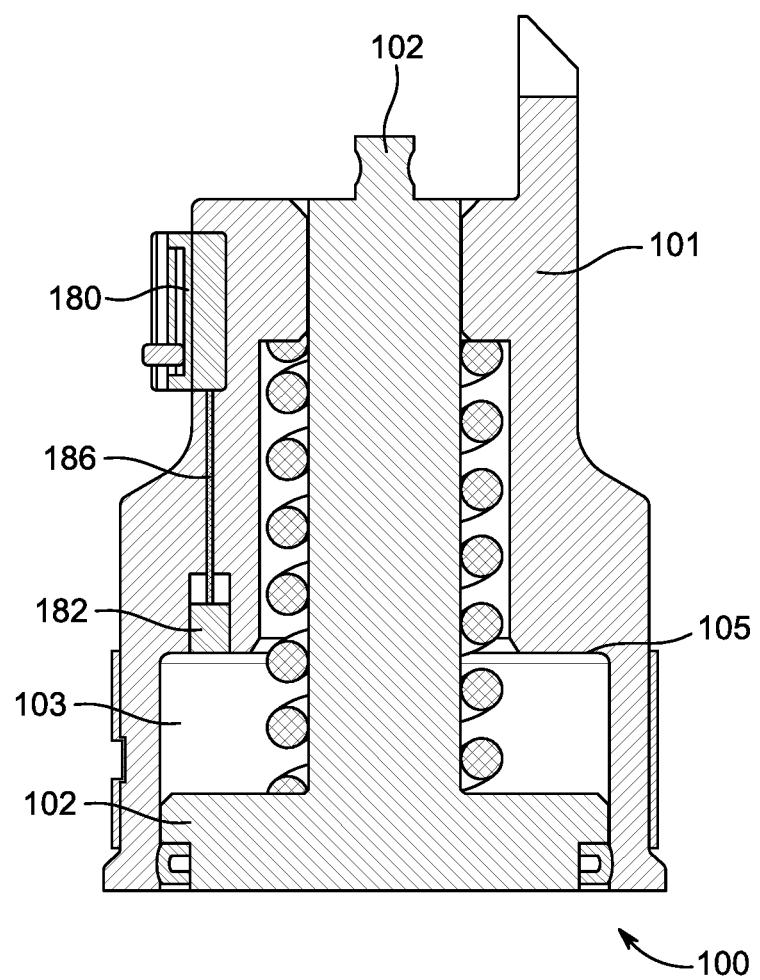
FIG. 25 is a perspective view showing a counter and contact switch implemented in a power unit cylinder.

As mentioned above, the counter may instead be incorporated into the power unit cylinder. FIG. 25 shows a digital counter 180 incorporated into cylinder 101 of power unit 100. Counter 180 is embedded within a pocket in the outer surface of power unit cylinder 101, or may alternatively be surface mounted on power unit cylinder 101. As shown in FIG. 25, piston 102 is housed and moves in bore 103 formed in cylinder 101. Bore 103 includes a stop surface or shoulder 105 that limits upward movement of piston 102 during a swage. In one implementation, contact switch 182 is housed within a smaller bore formed in stop surface 105 such that piston 102 contacts switch 182 during a swage. An electric signal is then sent by switch 182 to counter 180 either by connecting wire 186 (as shown) or by wireless connection. The swage event is then recorded, stored and displayed by counter 180.

Rotating Handle

Figure 26B:
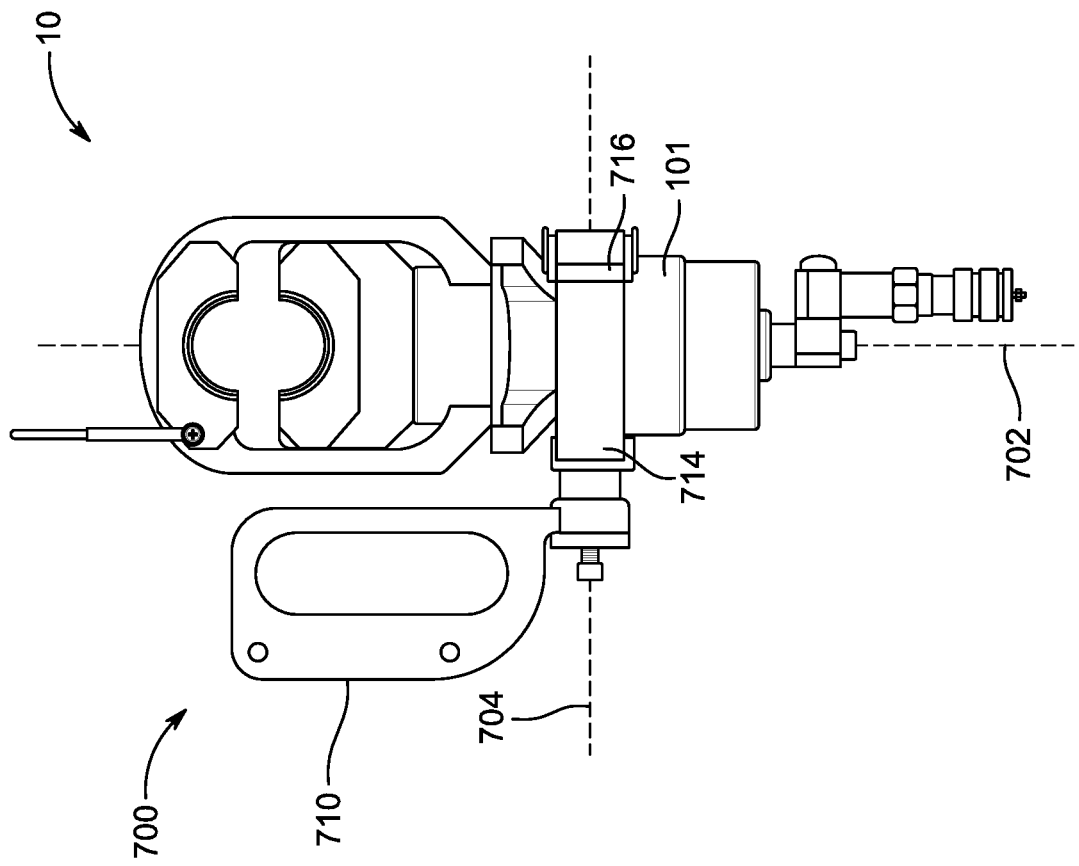
FIG. 26B is a side view of the rotating handle assembly mounted on the power tool.
Figure 26A:
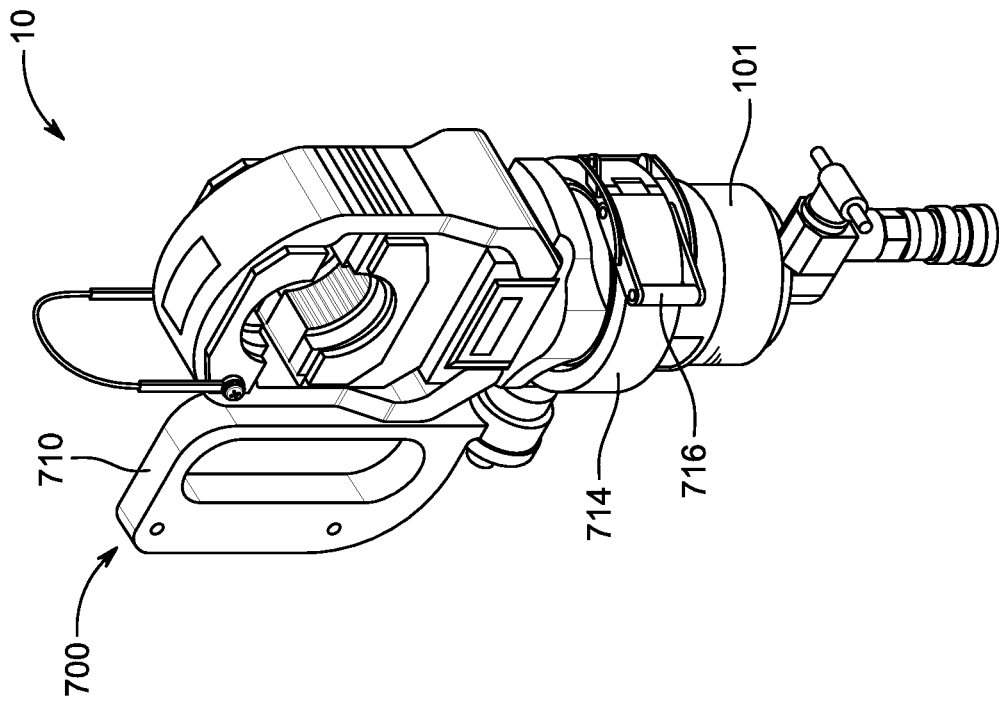
FIG. 26A is a perspective view of a rotating handle assembly mounted on a power tool.

Another feature of the invention is a rotating handle that allows the operator to quickly remove and/or reposition the swage tool in the field, and allows for more orientations of the tool, thereby improving tool usability and operator comfort. FIGS. 26A and 26B show rotating handle assembly 700 mounted on power tool 10. Rotating handle assembly 700 can be rotated about both cylinder axis 702 as well as handle axis 704, which is perpendicular to cylinder axis 702. The ease of use of power tool 702 is substantially improved by allowing rotating handle assembly 700 to be quickly removed or repositioned in a more desirable orientation depending on the environment that the tool is being used in, which may typically include tight uncomfortable spaces such as trenches.

Figure 27:
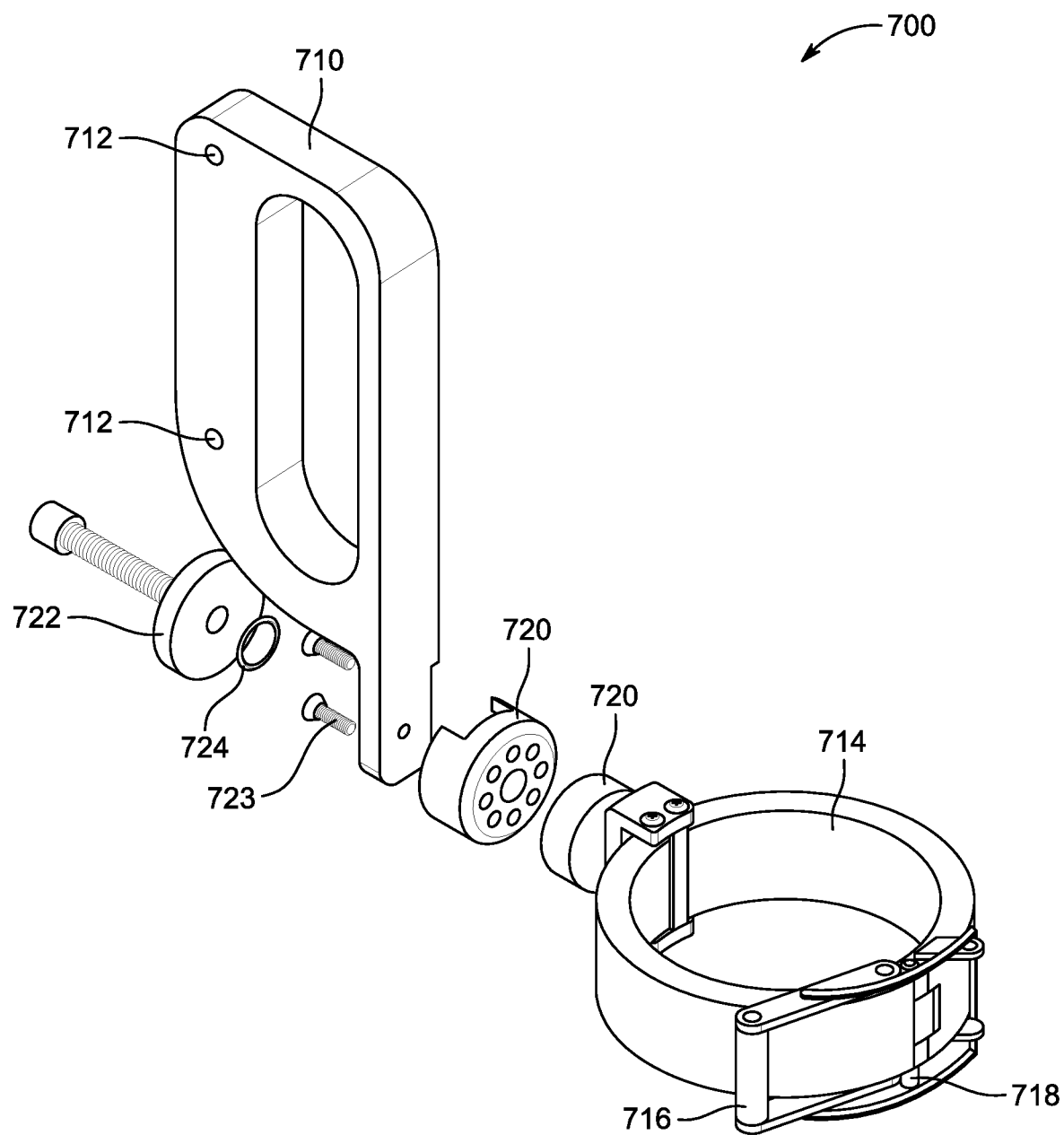
FIG. 27 is a disassembled, perspective view of the rotating handle assembly.

The components of rotating handle assembly 700 are illustrated in FIG. 27. Rotating handle assembly 700 comprises grip 710 that is attached via coupling 720 and cuffs 714 to power unit cylinder 101. Grip 710 is rotatable about both cylinder axis 702 and handle axis 704 and features holes 712 for rigging of power swage tool 10. Cuffs 714, which may be lined on the inside with rubber, are clamped to power unit cylinder 101 by draw style latch 716. Latch 716 also allows cuffs 714 to be quickly unclamped from power unit cylinder 101 such that rotating handle assembly 700 can be rotated in a first direction about power unit cylinder 101 (i.e. rotation about cylinder axis 702), and reclamped to cylinder 101 at a new position. Locking pin 718 ensures that cuffs 714 are not accidentally opened while the tool is in use.

Grip 710 is coupled to cuffs 714 via coupling 720. Coupling 720 features a circular array of protruding pins on one side and corresponding holes on the opposite side, such that grip 710 can be rotated in a second direction about handle axis 704 to a set number (such as 8) of positions. Coupling 720 is tightened and untightened by thumb nut 722. Screws 723 and wave spring washer 724 secure thumb nut 722, grip 210 and coupling 720 to cuffs 714. Thumb nut 722 allows for easy disengagement and reengagement of coupling 720, without the need for tools having multiple loose parts, such that grip 710 may be easily rotated about handle axis 704 and secured at a new position. Wave spring washer 724 prevents thumb nut 722 from becoming loose during normal operation.

Figure 28C:
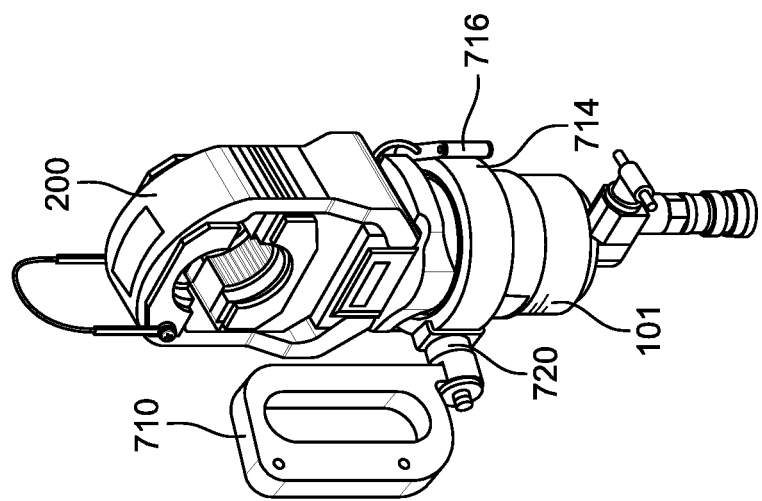
FIG. 28C is a perspective view of the power unit showing lock of the handle latch to secure the handle at the new position after rotation about the power tool axis.
Figure 28B:
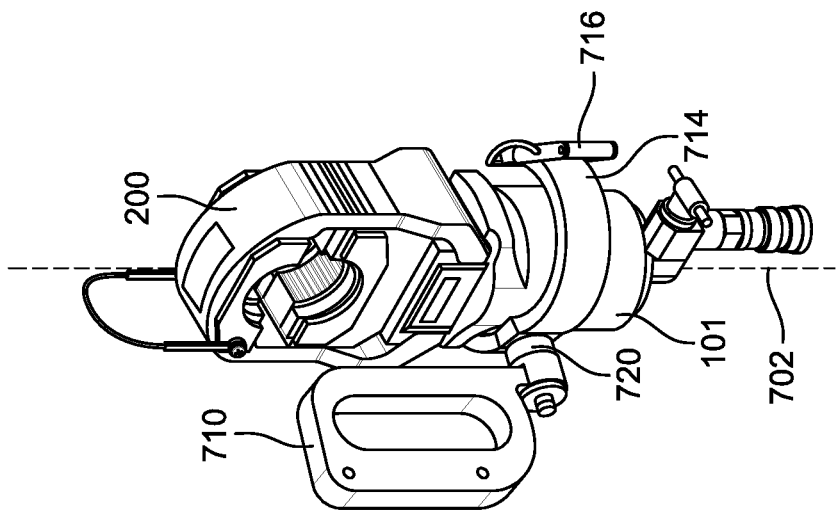
FIG. 28B is a perspective view of the power unit showing rotation of the handle about the power tool axis to a new position during handle latch release.
Figure 28A:
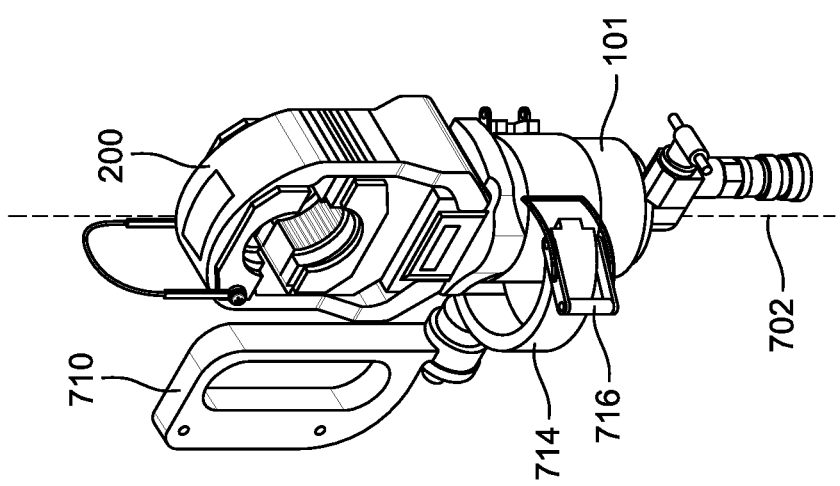
FIG. 28A is a perspective view of the power unit showing release of the handle latch to permit rotation of the handle about the power tool axis.

FIGS. 28A-28C illustrate rotation of grip 710 in the first direction about power unit cylinder 101 (rotation about cylinder axis 702). Without loosening coupling 720, latch 716 is released to allow cuffs 714 to be opened, such that grip 710 can be rotated about power unit cylinder 101 (FIG. 28A). As shown in FIG. 28B, grip 710 is rotated to a new position about cylinder 101. Latch 716 is then clamped down to lock cuffs 714 and grip 710 to cylinder 101 at the new position (FIG. 28C).

Figure 29C:
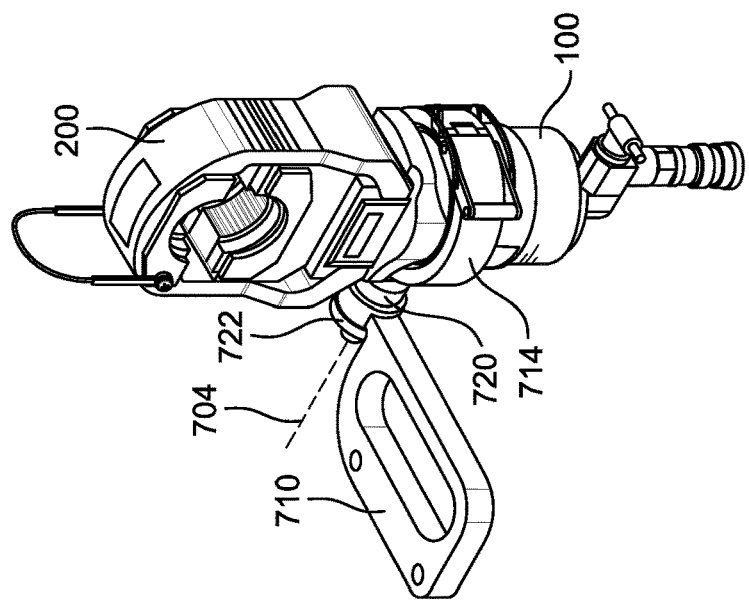
FIG. 29C is a the power unit showing the thumb nut re-tightened to secure the grip at the new position after rotation about the grip axis.
Figure 29B:
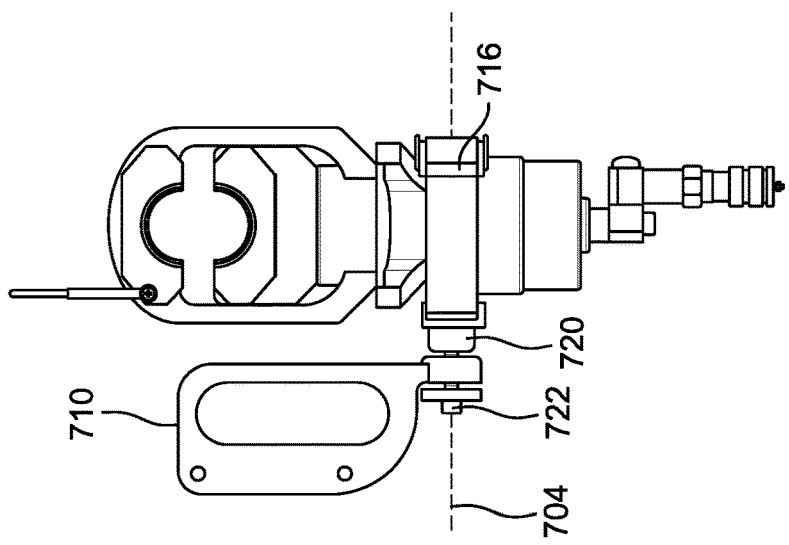
FIG. 29B is a side view of the power unit showing the thumb nut loosened to allow the grip to rotate about the grip axis.
Figure 29A:
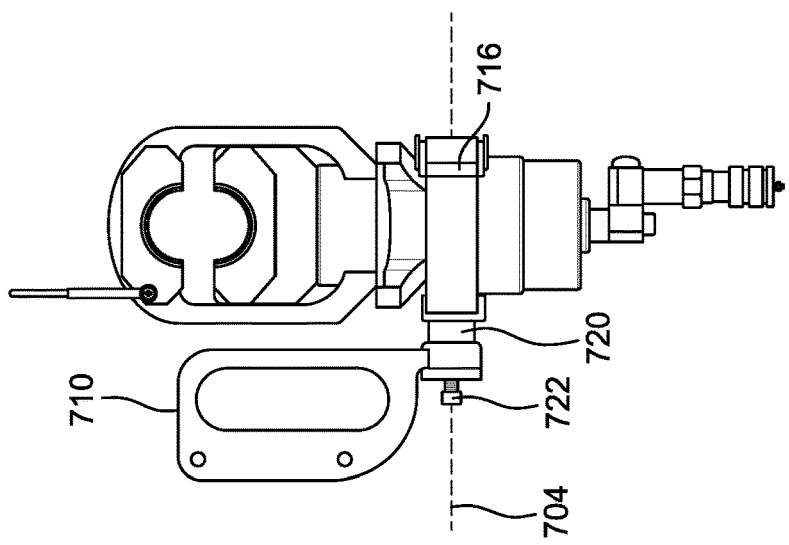
FIG. 29A is a side view of the power unit showing a starting handle grip position with the thumb nut tightened.

FIGS. 29A-29C illustrate rotation of grip 710 in the second direction about handle axis 704. FIG. 29A shows grip 710 at an initial position about handle axis 704. Without loosening latch 716, thumb nut 722 is loosened to loosen coupling 720 and allow grip 710 to rotate about handle axis 704 (FIG. 29B). Grip 710 is rotated about handle axis 704 to a new position, and thumb 722 is tightened to lock coupling 720 and grip 710 at the new position (FIG. 29C).

Wireless Remote Actuation

Another feature of the invention is remote wireless actuation of the hydraulic pump for power unit 100. Wireless remote actuation system 800 (FIG. 30) permits actuation of the tool even in an environment where the pump and operator of the swage tool are far apart from each other, at distances of greater than 50 feet, for example, or where the tool and pump are rigged above the ground. The use of wireless actuation allows the operator of the swage tool to actuate the tool without a control that is directly tethered to the hydraulic pump. System 800 provides a visual indication on the remote actuator (i.e. hand control) when the tool has reached maximum pressure and when a swage has been completed, which is especially useful in noisy environments.

Figure 30:
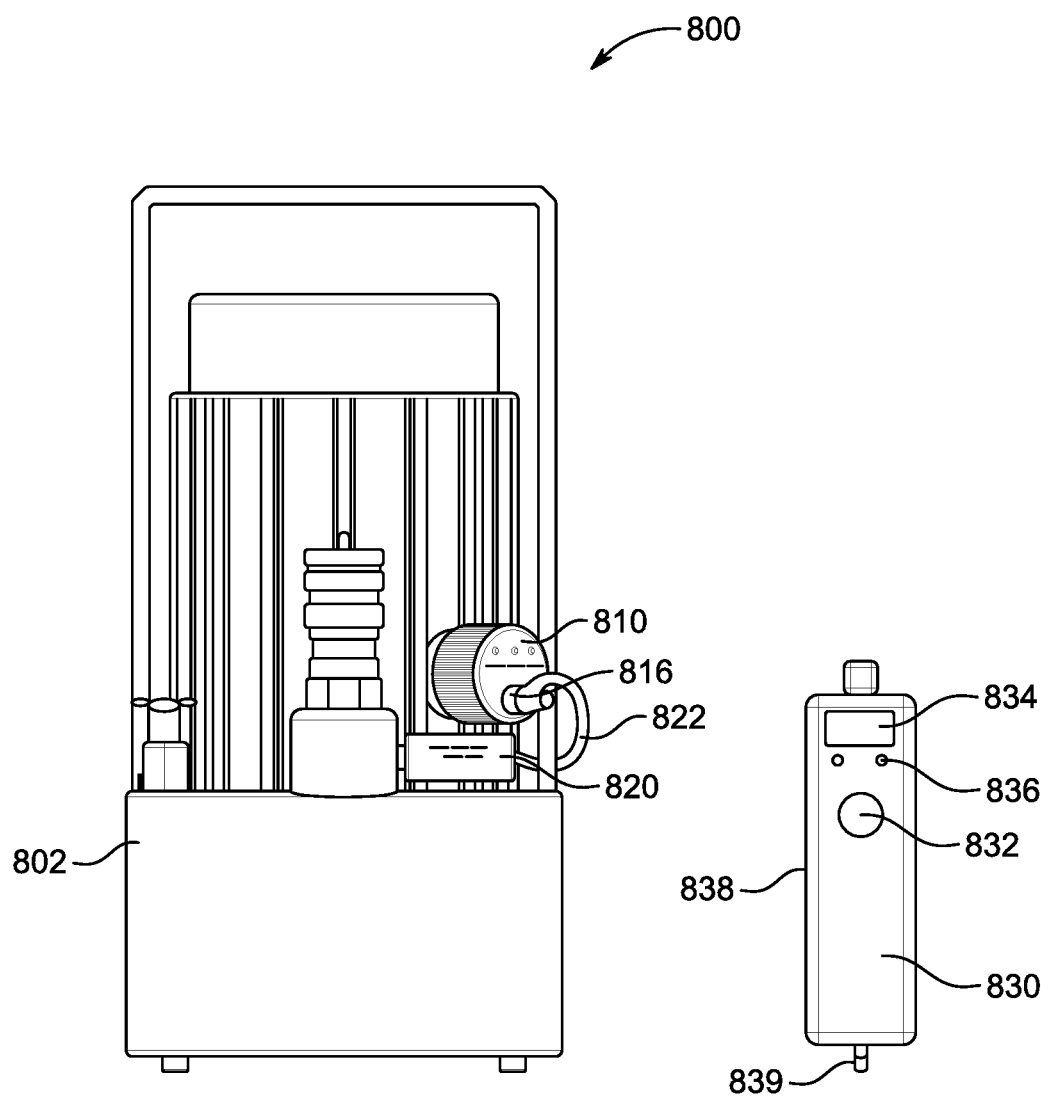
FIG. 30 is a perspective view of a wireless remote actuation system.
Figure 31:
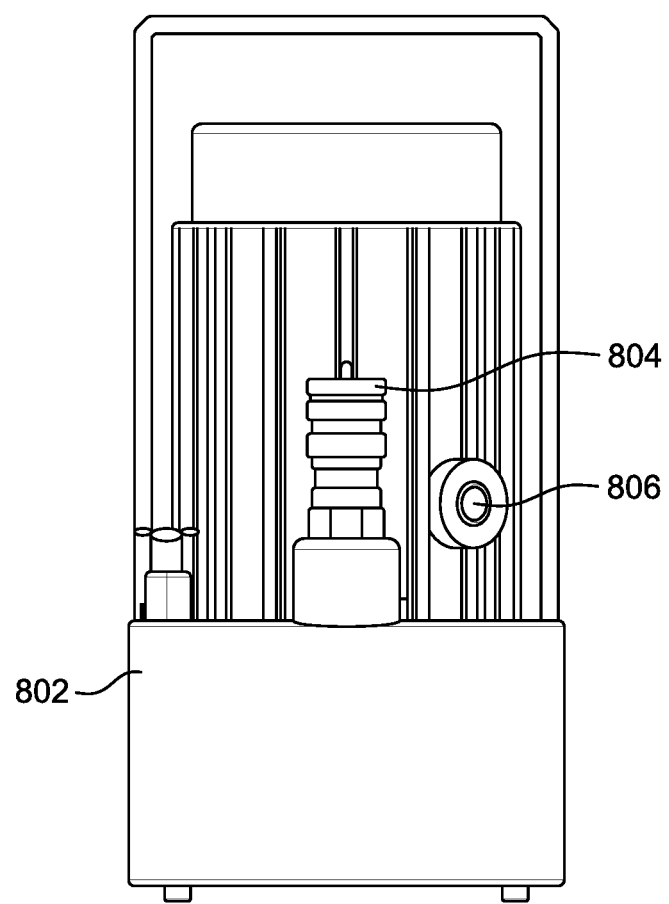
FIG. 31 is a perspective view of a hydraulic pump of the wireless remote actuation system.

As shown in FIG. 30, wireless remote actuation system 800 includes hydraulic pump 802, wireless relay 810, pressure sensor 820 and hand control 830. Hydraulic pump 802, shown in greater detail in FIG. 31, may be a standard electrically powered hydraulic pump suitable for use with swage tooling. Pump 802 provides pressurized fluid, at up to 10,000 PSI for example, to actuate power swage tool 10. Hydraulic pump 802 provides the pressurized fluid to power unit 100 to effect a swaging operation via a hydraulic hose connected to outlet 804 of pump 802 at one end and to power swage tool 10 at the other end.

Figure 32A:
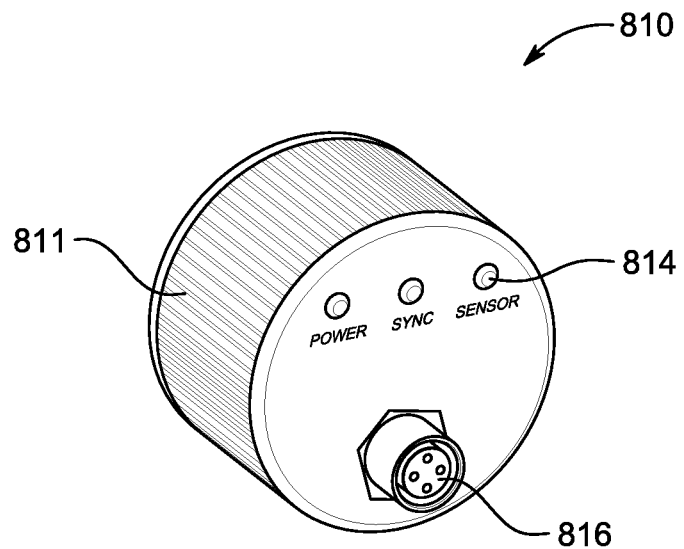
FIG. 32A is a front perspective view of a wireless relay of the wireless remote actuation system.
Figure 32B:
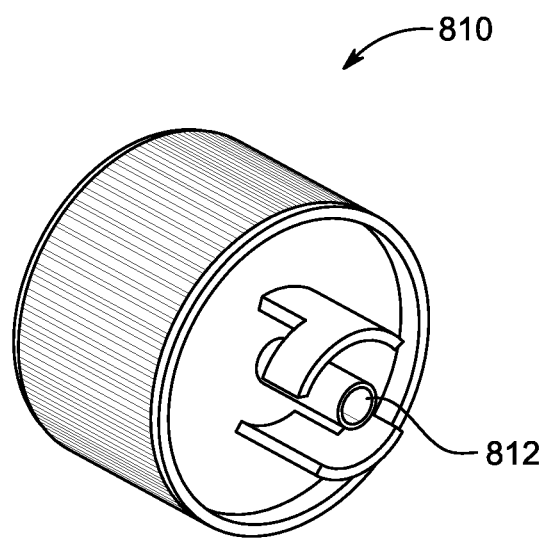
FIG. 32B is a rear perspective view of the wireless relay of the wireless remote actuation system.

A conventional pump for a conventional power swage tool is operated via a hand control or foot pedal that is directly tethered to terminal 806. According to the present invention, an electronic wirelessly controlled relay 810 replaces the conventional hand control or foot pedal and connects via prongs 812 on the rear of relay 810 (FIG. 32B) to terminal 806 of pump 802. Wireless relay 810 may be powered by batteries or by the power supply of pump 802. Casing 811 of relay 810 houses a relay, control circuitry, a wireless transmitter and receiver, and indicators 814. The circuitry inside casing or housing 811 reads output from pressure sensor 820, which is connected via terminal 816 to pressure sensor 820, and transmits information to be displayed on hand control 830. Indicators 814 on casing 811 may be light emitting diodes (LEDs), for example, and may include a power indicator LED to show that relay 810 is powered, a sync indicator LED that shows when a wireless connection has been established with hand control 830, and a sensor indicator LED that shows when the pressure sensor is connected and is being read properly. Casing 811 is preferably weatherproofed and ruggedized.

Pressure sensor 820 is tapped into the hydraulic line of pump 802 that leads to the power swage tool in order to read the line pressure. Pressure sensor 820 is connected by line 822 to terminal 816 on relay 810. Hand control 830 communicates with wireless relay 810. Hand control 830 includes a mechanism for actuating power swage tool 10, such as actuation button 832. When actuation button 832 is pressed, a signal is sent to wireless relay 810 to actuate hydraulic pump 802 for the duration that button 832 is pressed. Sensor 820 reads the hydraulic line pressure in pump 802 and sends it to relay 810. Relay 810 wirelessly transmits the hydraulic pressure to hand control 830, where it is displayed on display 834. Hand control 830 may also have indicator lights 836. For example, hand control 830 may include an indicator light that is illuminated when the pump reaches a certain pressure such as 10,000 PSI, and an indicator light that is illuminated when a wireless connection has been established with relay 810. Hand control 830 features a weatherproofed ruggedized housing 838, and a loop 839 to optionally connect a lanyard or clip. Wireless hand control 830 could be any other appropriate wireless actuation mechanism, such as, for example, a wireless foot control.

Tool Stand

Another feature of the invention is a customized stand for the power swage tool to assist in ease of use. The stand provides the operator with the ability to easily and safely set the tool down, thereby reducing operator fatigue. The tool can be set on the floor rather than in mud, dirt, water, etc., thereby keeping the tool clean and in the best working condition. The tool can be clamped or fixedly attached to a floor or table to keep the tool in a sturdy and upright position. The bus/cable can be set on the tool without falling so that heavy runs can be more easily set up and swaged. The tool can be placed in and removed from the stand without the need to disassemble the hose, which saves time and creates ease of use.

Figure 33B:
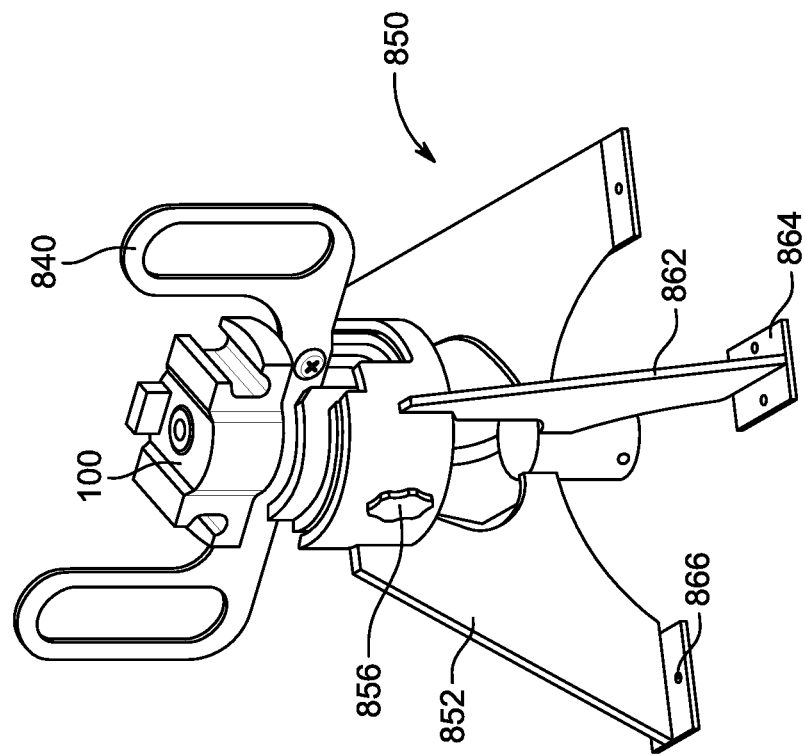
FIG. 33B is an assembled, perspective view of the first tool stand assembly of FIG. 33A holding a power unit.
Figure 33A:
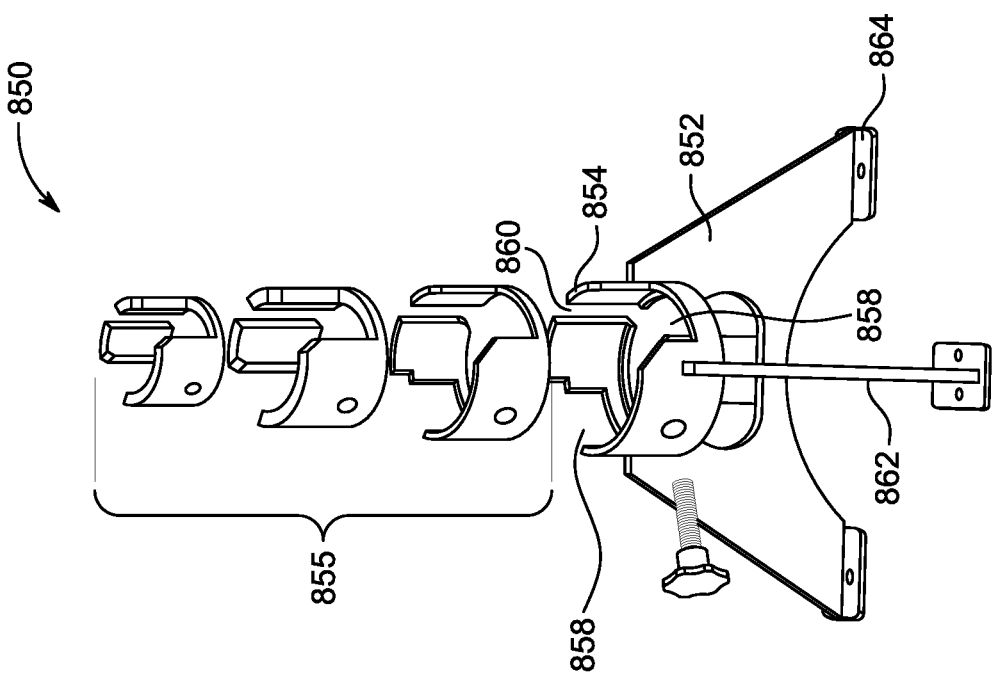
FIG. 33A is a disassembled, perspective view of a first tool stand assembly.

A first tool stand assembly 850 is illustrated in FIGS. 33A-33B. Stand assembly 850 is an adjustable stand that accommodates multiple tool sizes. Tool stand assembly 850 includes a four leg base 852 that supports and may be welded to a large cup 854 that fits a large size power tool. Tool stand assembly 850 includes additional smaller cups 855 of different sizes that can be placed into large cup 854 in order to accommodate various sizes of power units. Cups 854 and 855 may be held in place by a knob screw 856 that passes through cups 854/855 to keep them stable and from rotating or falling out. Cups 854/855 have a contour that matches the bottom of the power units of the power swage tool, such that the power units can easily be set in the stand in an upright fashion.

Each of cups 854/855 has two large gaps 858 on opposing sides to allow for power unit handles 840 to be easily placed in stand 850 without the need to remove handles 840. Cups 854/855 also have a fully open gap 860 that allow for the hydraulic hose of the power unit to be passed through so it does not have to be removed in order to place the power unit in stand assembly 850. Legs 862 of base 852 are welded to flat plates 864 with holes 866 drilled into them to allow for stand 850 to be drilled or clamped to a table or floor to provide a more stable base when working with long and heavy runs of cable/bus.

Figure 34A:
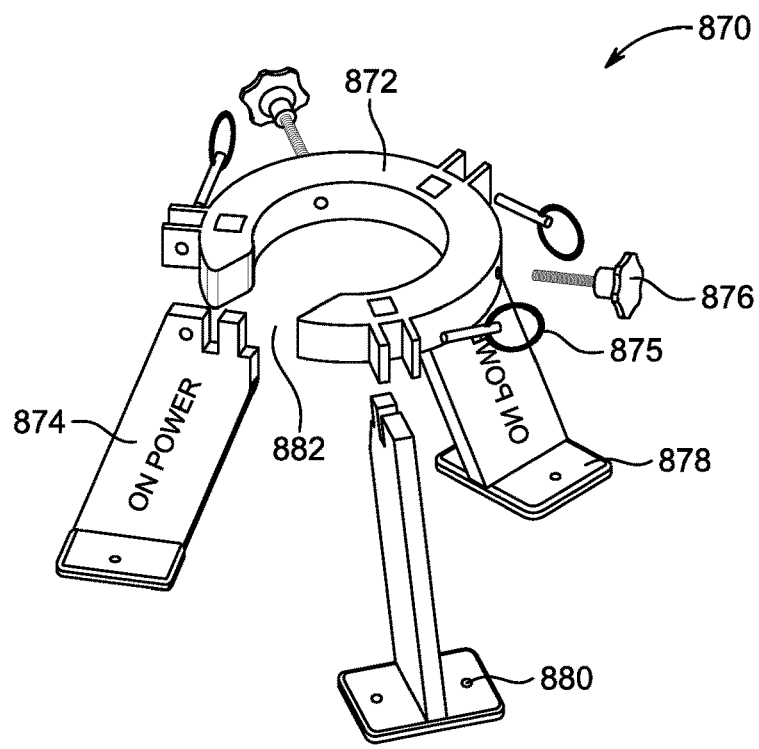
FIG. 34A is a disassembled, perspective view of a second tool stand assembly.
Figure 34B:
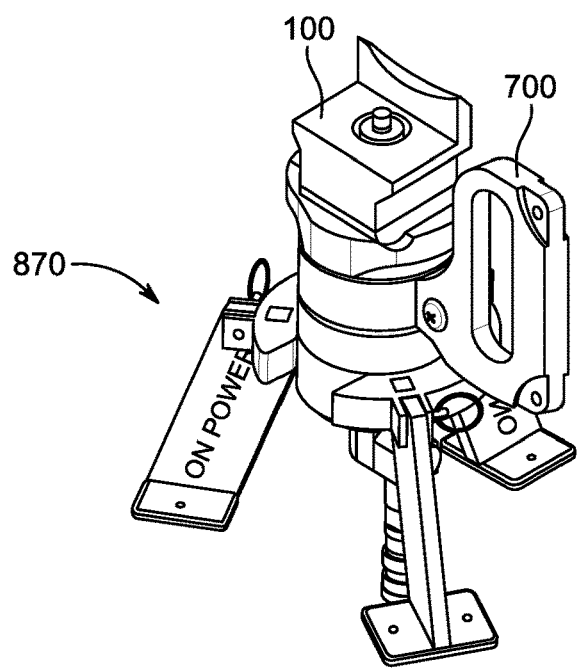
FIG. 34B is an assembled, perspective view of the second tool stand assembly of FIG. 34A holding a power unit.
Figure 35A:
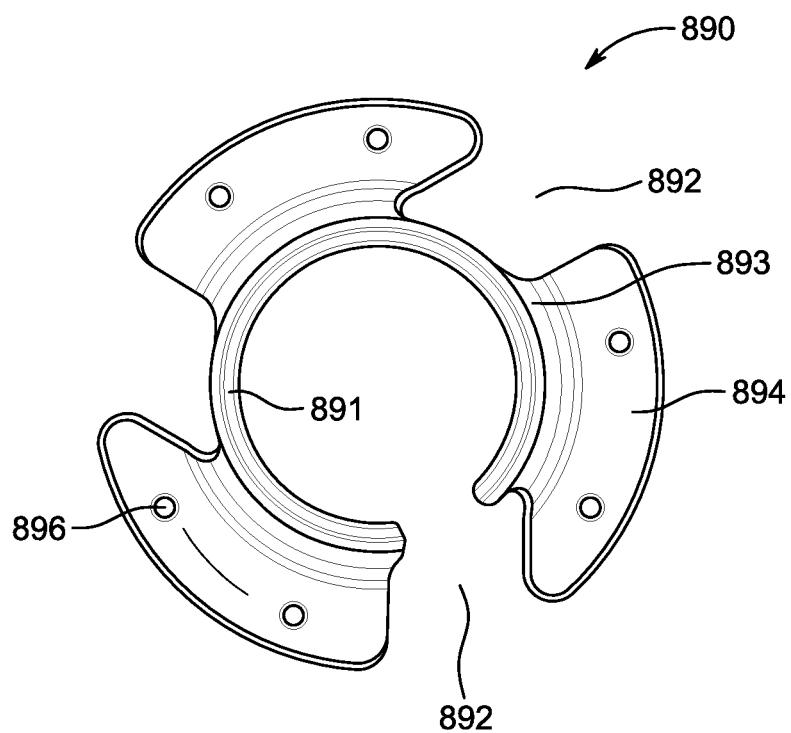
FIG. 35A is a top view of a third tool stand assembly.
Figure 35B:
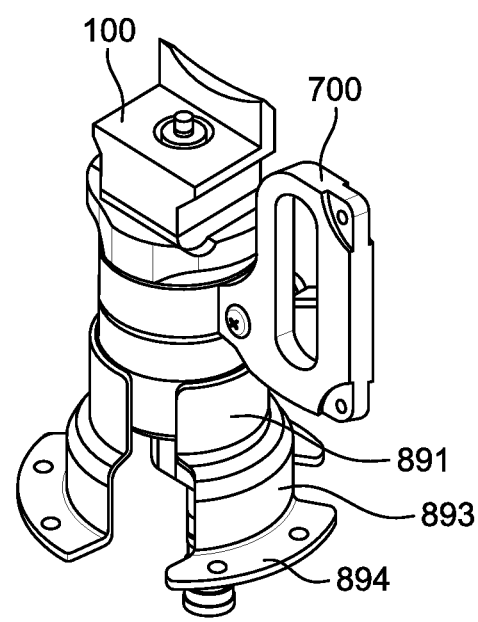
FIG. 35B is a perspective view of the third tool stand assembly holding a power unit.

Second tool stand assembly 870 is illustrated in FIGS. 34A-34B and comprises machined ring 872 attached to three legs 874. Second tool stand assembly 870 is a collapsible stand for individual power units. Legs 874 can either be detachably pinned via pins 875 to ring 872 to provide a collapsible design, or can be welded to ring 872 in order to provide a more permanent and rigid connection. The pinned configuration is advantageous in that the stand is fully collapsible and easier to ship and transport in smaller packaging.

Threaded knobs 876 extend through ring 872 and can be tightened to lock stand 870 onto a power unit that has been stood within ring 872. Legs 874 are welded to flat plates 878 with holes 880 formed in them to allow stand 870 to be drilled or clamped to a floor or table to provide a more stable base when working with long and heavy runs of cable/bus. Stand ring 872 has a fully open gap 882 to allow for the hose of the power units to be passed through so that it does not have to be removed in order to place a power unit in the stand.

Third tool stand assembly 890 is illustrated in FIGS. 35A-35D. Stand 890 is a casted or machined stand that accommodates a single power unit size. Stand base 891 has fully open gaps 892 to allow for the hose of a power unit to be passed through without having to be removed in order to place the power unit in the stand. Gaps 892 become larger on lower portions of stand 890 to provide areas that the hose can protrude from. Legs 893 of stand 890 curve into flanges 894 with holes 896 drilled into them to allow for stand 890 to be drilled or clamped to a table or floor to provide a more stable base when working with long and heavy runs of cable/bus.

Swage Die Identification

Swage dies 400 and 402 are the components that contact and create a swage on the connector. Swage dies 400 and 402 leave a pattern of imprinted teeth on the connector due to compression of the outer diameter of the connector. In conventional tooling, there is no way to identify the source of the tooling that was used to swage a connector. As quality issues may arise if deficient, counterfeit or otherwise inappropriate swage dies are used in conjunction with power tool 10, it is desirable to be able to identify the source of the swage die used to create the swage.

Figure 36A:
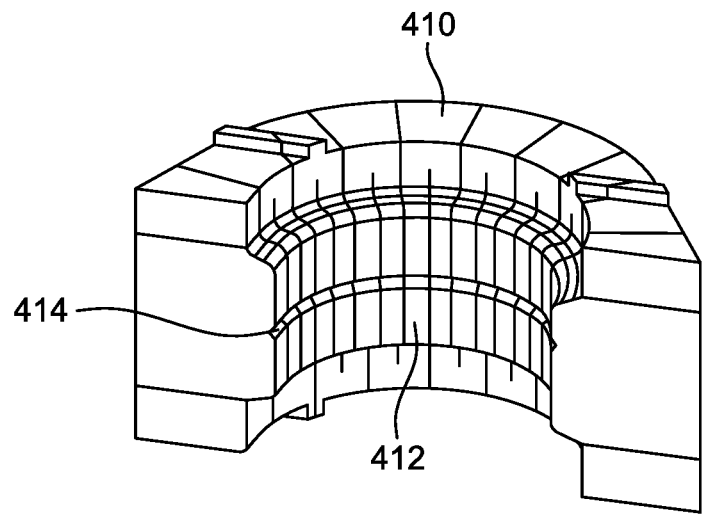
FIG. 36A is a perspective view of a swage die incorporating a machined slot for forming an identification imprint.
Figure 36B:
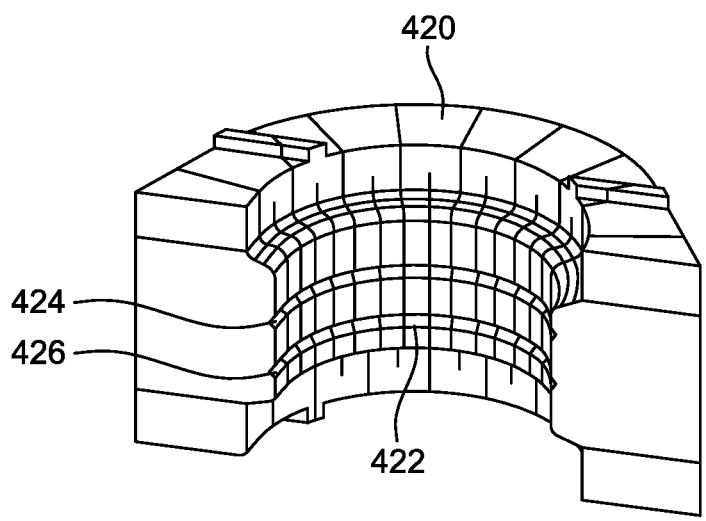
FIG. 36B is a perspective view of a swage die incorporating multiple machined slots for forming an identification imprint.
Figure 37:
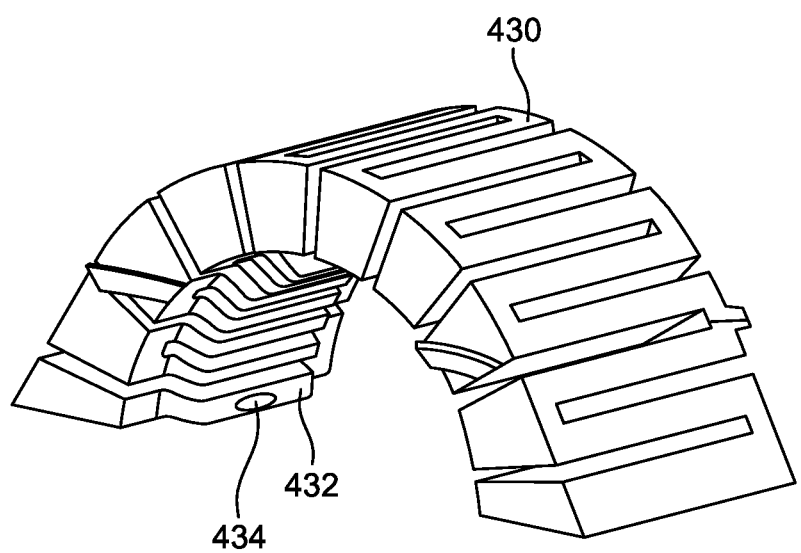
FIG. 37 is a perspective view of a swage die with etched markings for forming an identification imprint.

In order to address this issue, the present invention incorporates a feature on the swage die to create an identification imprint on the swage. In one implementation, one or more machined slots are formed through the die teeth. As shown in FIG. 36A, swage die 410 may be formed with a single machined slot 414 through die teeth 412, or as shown in FIG. 36B, multiple machined slots 424, 426 may be formed through die teeth 422 of swage die 420. Use of such machine slots creates an identification imprint in the form of a raised rib in the connector when swaged. Alternatively, as shown in FIG. 37, etched, lasered or machined markings 434 (such as letters) may be formed in die teeth 432 of swage die 430 to leave an imprinted design or lettering on the swaged connector.

In addition to creating an identification imprint on the swaged connector in order to identify the source of the swage die used to create the swage, the swage dies may be provided with an identifier to allow for quick and easy distinction between different swage types and sizes. Swage dies may be marked with a color, for example, that indicates a certain swage type or size. Wear and damage resistant paint is preferably used to allow for long usage life even in rough working conditions. The paint or other color indicator should be placed on the side surfaces only of the swage dies so as not to reduce the quality of the swage.

The invention claimed is:

1. A swage tool comprising:
   a power unit;
   a yoke fixedly attached to the power unit that holds an upper swage die;
   a die block that holds a lower swage die and that is moved by the power unit towards the upper swage die; and
   a quick release endplate assembly that is configured to be disassembled and assembled without use of any tool, wherein the quick release endplate assembly hold the upper swage die in the yoke, wherein the quick release endplate assembly comprising:
   upper endplates secured to opposite lateral sides of the yoke and the upper swage die, wherein the lateral sides are perpendicular to an inner facing surface of the yoke and an outer facing surface of the yoke;
   a plurality of magnets embedded within each of the upper endplates, wherein the plurality of magnets is configured to magnetically engage the yoke from opposite lateral sides and to provide strength against a force perpendicular to a face of each of the upper endplates; and
   a set of pins protruding laterally from each of the upper endplates, wherein the plurality of magnets are positioned between the set of pins, and wherein the set of pins is configured to engage pin holes within the yoke and position each of the upper endplates, to provide additional clamping strength against the force, and to resist a rotating force applied to the upper endplates.

2. The swage tool of claim 1, further comprising a retaining clamp configured to retain the upper endplates against the yoke, the retaining clamp comprising:
   a threaded standoff that extends through a through yoke hole through a raised portion of the yoke;
   bent clamp pieces on each end of the standoff configured to engage the threaded standoff at a first end and one of the upper endplates at a second end; and
   threaded knobs configured to engage a threaded end of the threaded standoff, to be tightened and loosened without any tool, and when tightened to hold the bent clamp pieces against the upper endplates, wherein loosening a threaded knob without removing the threaded knob will enable a bent clamp piece to be rotated sufficient for removal of an upper endplate.

3. The swage tool of claim 2, wherein each upper endplate includes a deformation configured to fit one of the bent clamp pieces.

4. The swage tool of claim 1, further comprising a second quick release endplate assembly that is configured to be disassembled and assembled without use of any tool, wherein the second quick release endplate assembly holds the lower swage die in the die block, wherein the second quick release endplate assembly comprising:
   lower endplates configured to secure opposite sides of the lower swage die;
   a second set magnets embedded within each of the lower endplates, wherein the second set of magnets is configured to magnetically engage the die block and to provide strength against a second force perpendicular to a face of each of the lower endplates;
   a second set of pins protruding from each of the lower endplates, wherein the second set of pins is configured to engage pin holes in the die block and position each of the lower endplates, to provide additional clamping strength against the second force, and to resist the rotating force applied to the lower endplates.

5. The swage tool of claim 4, further comprising a retaining clamp configured to retain the lower endplates against the die block, the retaining clamp comprising:
   a threaded standoff that extends through a through die block hole through a portion of the die block;
   bent clamp pieces on each end of the standoff configured to engage the threaded standoff at a first end and one of the lower endplates at a second end; and
   threaded knobs configured to engage a threaded end of the threaded standoff, to be tightened and loosened without any tool, and when tightened to hold the bent clamp pieces against the lower endplates, wherein loosening a threaded knob without removing the threaded knob will enable a bent clamp piece to be rotated sufficient for removal of a lower endplate.

6. The swage tool of claim 5, wherein each lower endplate includes a deformation configured to fit one of the bent clamp pieces.

7. A swage tool comprising:
   a power unit;
   a yoke fixedly attached to the power unit that holds an upper swage die, wherein the yoke includes a set of protrusions on opposite lateral faces of the yoke;
   a die block that holds a lower swage die and that is moved by the power unit towards the upper swage die;
   a quick release endplate assembly that is to be disassembled and assembled without use of any tool, wherein the quick release endplate assembly holds the upper swage die in the yoke, wherein the quick release endplate assembly comprises:
   upper endplates formed with a channel along a lateral-facing surface, configured to slidably receive the set of protrusions, and configured to secure opposite sides of the yoke.

8. The swage tool of claim 7, wherein the set of protrusions are male channel tabs.

9. The swage tool of claim 7, wherein the channel includes a positive stop at one end.

10. The swage tool of claim 7, wherein the die block includes a second set of protrusions on opposite faces of the die block, further comprising a second quick release endplate assembly that is configured to be disassembled and assembled without use of any tool, wherein the second quick release endplate assembly holds the lower swage die in the die block, wherein the quick release endplate assembly comprising lower endplates formed with a second channel configured to receive the second set of protrusions.

11. The swage tool of claim 10, wherein the second set of protrusions are male channel tabs.

12. The swage tool of claim 10, wherein the second channel includes a second positive stop at one end.

13. A swage tool, comprising:
   a power unit;
   a hose extending from the power unit;
   a yoke fixedly attached to the power unit that holds an upper swage a die;
   a die block that holds a lower swage die and that is moved by the power unit towards the upper swage die; and
   a removable stand, wherein the stand comprises:
   a base;
   legs attached to the base for standing the base upright on a surface; and a circular portion formed by or connected to the base, the circular portion comprising a fully open gap to allow the hose to pass through.

14. The swage tool of claim 13, wherein the circular portion comprises stackable cups including a series of three or more different sized cups, wherein a large cup that is fixedly attached to the base, a next smaller cup in the series of three or more different sized cups is configured to be placed within the large cup and a next even smaller cup in the series of three or more different sized cups is configured to be placed within the next smaller cup.

15. The swage tool of claim 14, wherein, the power unit further comprises a handle, and for each cup of the stackable cups, at least one additional gap is formed in a sidewall to allow one or more handles of the power unit to pass through.

16. The swage tool of claim 13, wherein the stand is collapsible and the circular portion comprises a machined ring that can be detachably pinned to the legs.

17. The swage tool of claim 16, wherein the machined ring comprises at least one threaded knob extending through the machined ring and locking to the power unit.

18. The swage tool of claim 13, wherein the legs attached to the base form flat flanges that support the stand on a surface.

19. A swage tool comprising:
a power unit;
a yoke fixedly attached to the power unit that holds an upper swage die;
a die block that holds a lower swage die and that is moved by the power unit towards the upper swage die; and
an upper quick release endplate assembly that is configured to be disassembled and assembled without use of any tool, wherein the upper quick release endplate assembly holds the upper swage die in the yoke, wherein the upper quick release endplate assembly comprising:
four push pin assemblies, each push pin assembly including a knob connected to an end of a shaft having a locking pin near an opposite end of the shaft, a raised shoulder formed between the shaft and the knob, a spring, and a hollow cylindrical housing having an interior shoulder with a central opening, wherein the spring is installed on the shaft between the locking pin and the raised shoulder, wherein the shaft, the spring and the raised shoulder are inserted into the hollow cylindrical house so the end extends through the central opening;
two slotted dowel pins embedded within the yoke, each slotted dowel pin including a cylinder open at each end, each open end including an L-shaped slot formed through a sidewall of the cylinder and configured to receive the end of the shaft and the locking pin; and
two upper endplates configured to secure opposite sides of the upper swage die, each upper endplate including holes for receiving the end of the shaft and the locking pin of each push pin assembly and each hole configured to align with each open end of a slotted dowel pin, wherein the end of the shaft of each slotted dowel pin is configured to be inserted through a hole in the upper endplate and into a slotted down pin with the locking pin travelling through an axial portion of the L-shaped slot until the spring is compressed sufficiently for the locking pin to be turned in a circumferential direction so the locking pin travels through a perpendicular portion of the L-shaped slot and locks the push pin assembly in place.

20. The swage tool of claim 19, further comprising a lower quick release endplate assembly that is configured to be disassembled and assembled without use of any tool, wherein the lower quick release endplate assembly holds the lower swage die in the die block, wherein the lower quick release endplate assembly comprising:
four additional push pin assemblies, each additional push pin assembly including a second knob connected to a second end of a second shaft having a second locking pin near a second opposite end of the second shaft, a second raised shoulder formed between the second shaft and the second knob, a second spring, and a second hollow cylindrical housing having a second interior shoulder with a second central opening, wherein the second spring is installed on the second shaft between the second locking pin and the second raised shoulder, wherein the second shaft, the second spring and the second raised shoulder are inserted into the second hollow cylindrical house so the second end extends through the second central opening;
two additional slotted dowel pins embedded within the die block, each additional slotted dowel pin including a second cylinder open at each second end, each second open end including a second L-shaped slot formed through a second sidewall of the second cylinder and configured to receive the second end of the second shaft and the second locking pin; and
two lower endplates configured to secure opposite sides of the lower swage die, each lower endplate including second holes for receiving the second end of the second shaft and the second locking pin of each additional push pin assembly and each second hole configured to align with each second open end of an additional slotted dowel pin, wherein the second end of the second shaft of each additional slotted dowel pin is configured to be inserted through a second hole in the lower endplate and into an additional slotted down pin with the second locking pin travelling through a second axial portion of the second L-shaped slot until the second spring is compressed sufficiently for the second locking pin to be turned in a circumferential direction so the second locking pin travels through a second perpendicular portion of the second L-shaped slot and locks the additional push pin assembly in place.

21. A swage tool comprising:
a power unit;
a yoke fixedly attached to the power unit that holds an upper swage die;
a die block that holds a lower swage die and that is moved by the power unit towards the upper swage die; and
an upper quick release endplate assembly that is configured to be disassembled and assembled without use of any tool, wherein the upper quick release endplate assembly holds the upper swage die in the yoke, wherein the upper quick release endplate assembly comprising:
two push button assemblies, each push button assembly comprising a push button connected to an end of a shaft having a push pin at an opposite end of the shaft, wherein each push pin is connected to the push button through the shaft and configured to extend from the shaft until the push button is pressed to retract the push pin;

two channels formed within the yoke and configured to receive the opposite end of the shaft and the push pin;

two retaining caps; and two upper endplates configured to secure opposite sides of the upper swage die, a first upper endplate retaining the two retaining caps and a second upper endplate including holes for receiving the opposite end of the shaft and the push pin of each push button assembly, wherein each hole in the second upper endplate aligns with one of the two channels formed within the yoke, wherein the opposite end of the shaft of each push button assembly is configured to be inserted through the hole in the upper endplate when the push pin is retracted, into one of the two channels formed within the yoke and into a retaining cap, where the push pin is extended to lock the push button assembly in place.

22. The swage tool of claim 21, each push button assembly further comprising a spring positioned to be compressed between the end of the shaft and the second upper endplate.

23. The swage tool of claim 21 further comprising:

a lower quick release endplate assembly that is configured to be disassembled and assembled without use of any tool, wherein the lower quick release endplate assembly holds the lower swage die in the die block, wherein the lower quick release endplate assembly comprising:

two additional push button assemblies, each additional push button assembly comprising a second push button connected to a second end of a second shaft having a second push pin at a second opposite end of the second shaft, wherein each second push pin is connected to the second push button through the second shaft and configured to extend from the second shaft until the second push button is pressed to retract the second push pin;

two channels formed within the die block and configured to receive the second opposite end of the second shaft and the second push pin;

two additional retaining caps; and two lower endplates configured to secure opposite sides of the lower swage die, a first lower endplate retaining the two additional retaining caps and a second lower endplate including second holes for receiving the second opposite end of the second shaft and the second push pin of each additional push button assembly, wherein each second hole in the second lower endplate aligns with one of the two channels within the die block, wherein the second opposite end of the second shaft of each additional push button assembly is configured to be inserted through the second hole in the lower endplate when the second push pin is retracted, into one of the two channels through die block and into an additional retaining cap, where the second push pin is extended to lock the additional push button assembly in place.

24. The swage tool of claim 21, each additional push button assembly further comprising a second spring positioned to be compressed between the second end of the second shaft and the second lower endplate.

25. A swage tool comprising:

a power unit;

a yoke fixedly attached to the power unit that holds an upper swage die;

a die block that holds a lower swage die and that is moved by the power unit towards the upper swage die; and a quick release rotating handle assembly configured to be released and assembled without use of any tool, the quick release rotating handle assembly comprising:

a grip attached to the power unit via a coupling configured to enable rotation of the grip around a first axis, the coupling including a circular array of protruding pins on one side and corresponding holes on an opposite side, a screw through a central opening of the one side and the opposite side; and a thumb nut engaging the one side with the opposite side when tightened and disengaging the one side from the opposite side when loosened without being removed from the screw, and a cuff positioned around an exterior of the power unit configured to enable rotation of the grip around a second axis perpendicular to the first axis, the cuff including a latch for clamping and unclamping the cuff and a locking pin.

26. The swage tool of claim 25, further comprising a rubber liner positioned between the cuff and the power unit.

27. A swage tool comprising:

a power unit;

a yoke fixedly attached to the power unit that holds an upper swage die;

a die block that holds a lower swage die and that is moved by the power unit towards the upper swage die; and a yoke shroud assembly comprising:

a bent shroud contoured to fit closely around an outward-facing surface of the yoke, and a first bracket and a second bracket secured to opposite ends of a contoured concave inner-facing surface of the yoke, wherein the first bracket and the second bracket are secured to the yoke and the bent shroud using a respective set of screws, and at least one spacer positioned between each bracket and the inner-facing surface of the yoke.

28. The swage tool of claim 27 further comprising a rubber liner positioned between the bent shroud and the yoke.

* * * * *